United States Patent
Calvet et al.

(10) Patent No.: US 7,266,272 B1
(45) Date of Patent: Sep. 4, 2007

(54) MOTION CONTROL STAGES AND METHODS OF MAKING THE SAME

(75) Inventors: Robert J. Calvet, Pasadena, CA (US); Roman C. Gutierrez, La Crescenta, CA (US)

(73) Assignee: Siimpel Corporation, Arcadia, CA (US)

( * ) Notice: Subject to any disclaimer, the term of this patent is extended or adjusted under 35 U.S.C. 154(b) by 63 days.

(21) Appl. No.: 11/041,122

(22) Filed: Jan. 21, 2005

Related U.S. Application Data

(63) Continuation-in-part of application No. 10/067,466, filed on Feb. 4, 2002, now Pat. No. 6,850,675.

(51) Int. Cl.
  *G02B 6/26* (2006.01)
  *G02B 6/00* (2006.01)
  *G02B 7/182* (2006.01)

(52) U.S. Cl. .................. 385/52; 385/147; 359/871

(58) Field of Classification Search ............... 385/52, 385/53, 88–94, 134–137, 147; 359/871–878
See application file for complete search history.

(56) References Cited

U.S. PATENT DOCUMENTS 5,461,515 A * 10/1995 Sorce .................... 359/872
6,071,143 A * 6/2000 Barthel et al. ............. 439/377
6,914,635 B2   7/2005 Ostergard

OTHER PUBLICATIONS

Akihiro Koga et al.; "Electrostatic Linear Microactuator Mechanism for Focusing a CCD Camera"; Journal of Lightwave Technology, vol. 17, No. 1: p. 43-47; Jan. 1999.

* cited by examiner

*Primary Examiner*—Quyen P Leung
(74) *Attorney, Agent, or Firm*—MacPherson Kwok Chen & Heid LLP; Tom Chen

(57) ABSTRACT

A motion control stage assembly includes a payload assembly and a base assembly joined together with connecting elements. The connecting elements provide degenerate support between the base and the payload such that a desired trajectory of the payload with respect to the base is relatively unconstrained. The connecting element assemblies are substantially planar, and each includes a first connecting element with a first intermediate point, a second connecting element with a second intermediate point, and a secondary connecting element that joins the first and second connecting elements at the first and second intermediate points. The first and the second connecting elements may be formed integrally with each other, of materials including a semiconductor material, a resilient metal or a plastic, and by processes including micromachining, wire-electrical-discharge machining, or injection molding.

17 Claims, 17 Drawing Sheets

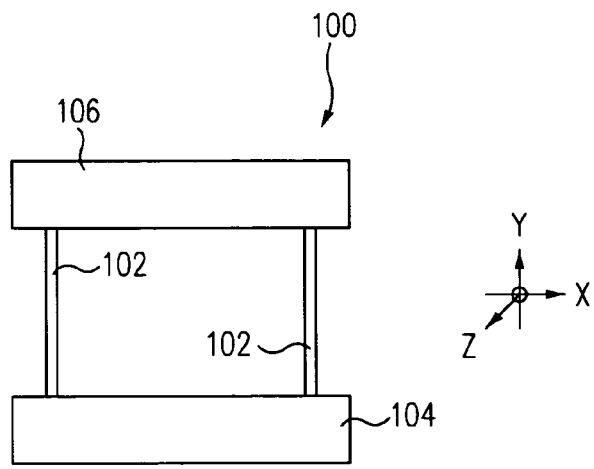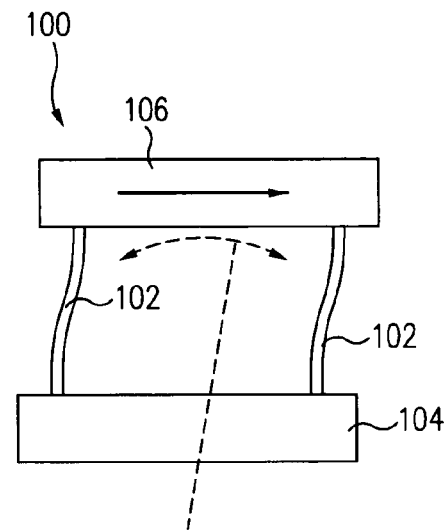
FIG. 10A
(PRIOR ART)
FIG. 10B
(PRIOR ART)
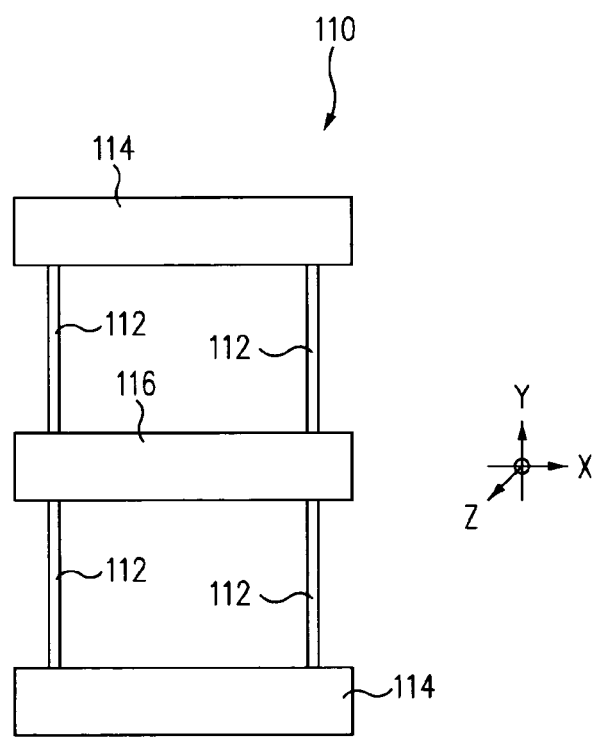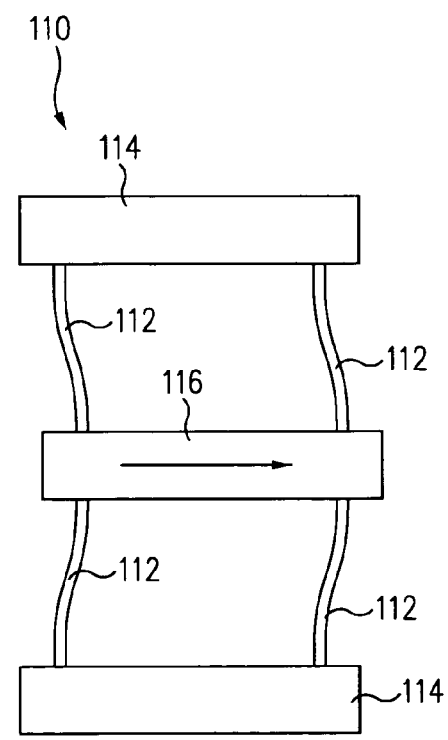
FIG. 11A
(PRIOR ART)
FIG. 11B
(PRIOR ART)

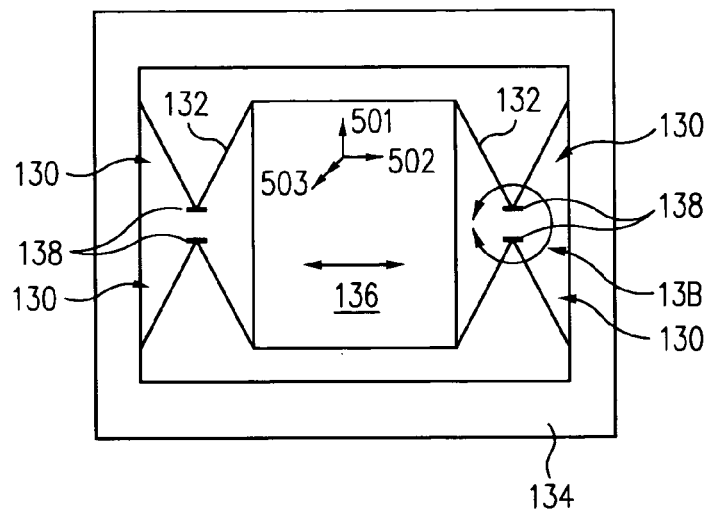 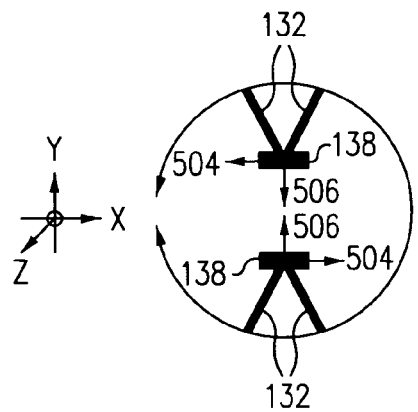
FIG. 13A          FIG. 13B
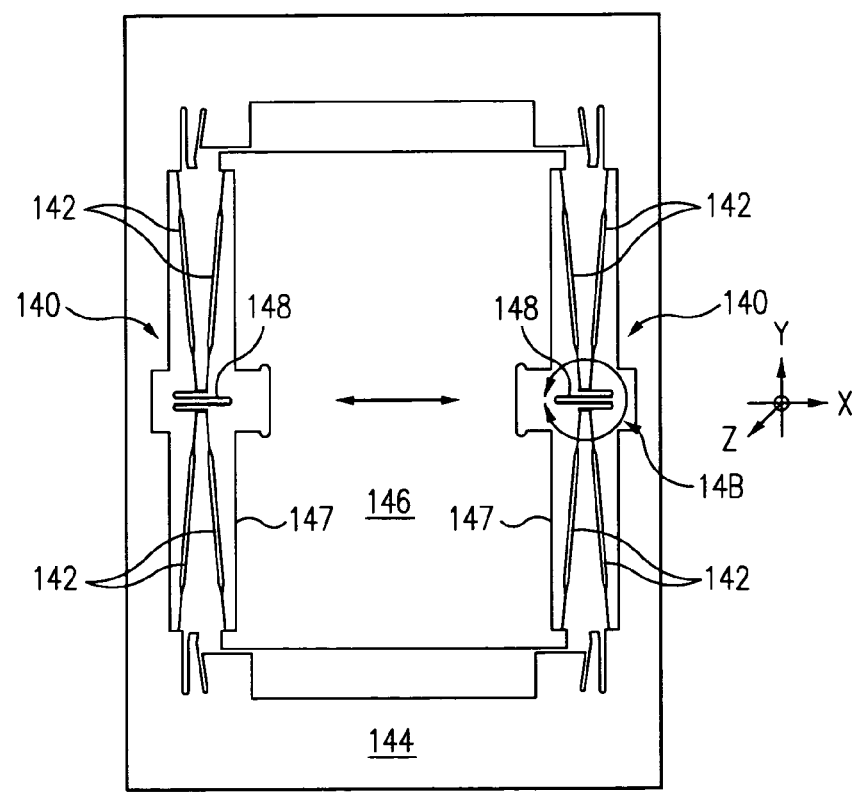 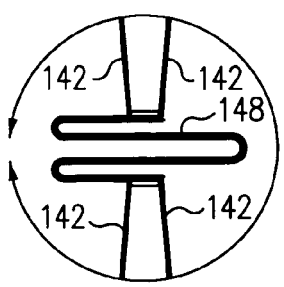
FIG. 14A          FIG. 14B

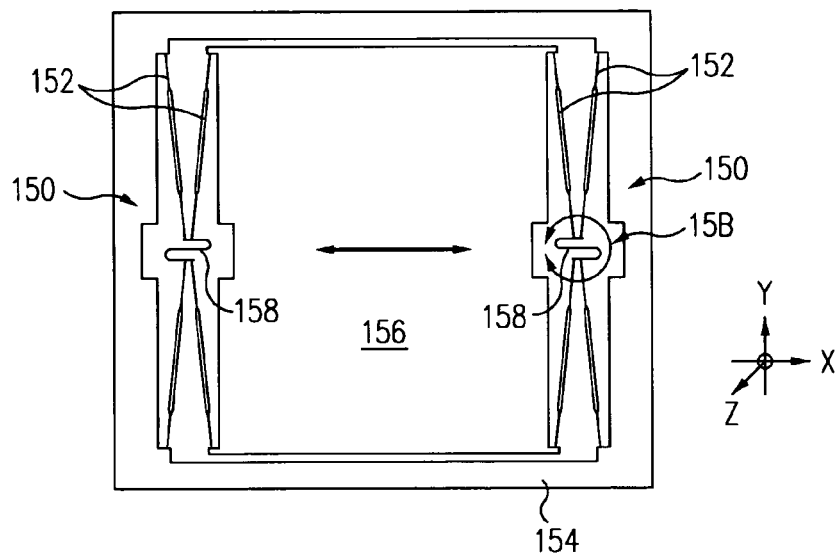
FIG. 15A
FIG. 15B
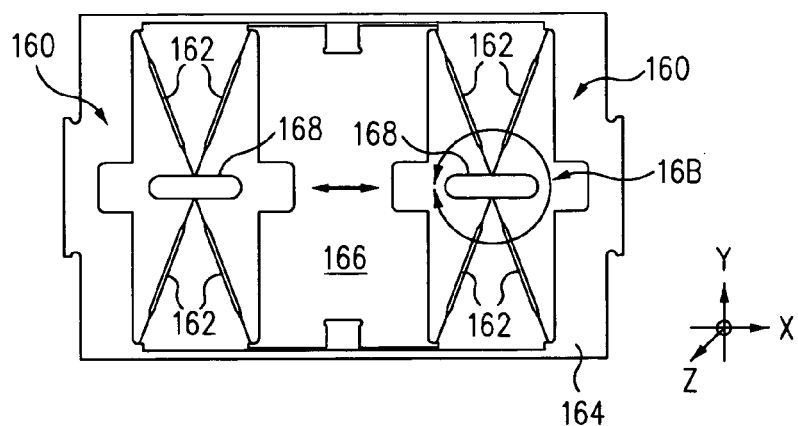
FIG. 16A
FIG. 16B

MOTION CONTROL STAGES AND METHODS OF MAKING THE SAME

RELATED APPLICATIONS

This application is a continuation-in-part of application Ser. No. 10/067,466, filed Feb. 4, 2002, now U.S. Pat. No. 6,850,675, issued Feb. 1, 2005. This application is also related to co-owned U.S. Pat. Nos. 6,546,182, issued Apr. 8, 2003, and 6,661,962, issued Dec. 9, 2003, the disclosures of which are incorporated herein in their entireties by this reference.

BACKGROUND OF THE INVENTION

1. Field of the Invention

The present invention relates generally to optical devices, and more particularly, to optical element alignment assemblies and methods of making the same.

2. Description of the Related Art

An optical component, such as a mirror, lens or fiber, in an optical instrument or device, such as an optical switch, camera, or projector, should be accurately located/positioned with respect to another optical component in order for the optical instrument or device to function properly. Thus, optical devices may require their components to be placed with exacting tolerances to fulfill design objectives. In some cases, optical devices may require their components to be placed with exacting tolerances along a trajectory, to enable precise motion of the components.

Conventional passive alignment assemblies for MicroElectroMechanical System (MEMS) devices are typically planar in nature and align only local elements, e.g., a fiber and ball lens collimator, in which the two components are disposed within a few millimeters of each other. Alignments over larger distances (e.g., greater than about five millimeters), and three-dimensional optical systems typically use conventionally machined components. Such assemblies often are incapable of aligning optical components with high intrinsic precision.

SUMMARY OF THE INVENTION

Components generally need to be located in three dimensions, i.e., distributed in a volume of space, and have three rotations specified and/or controlled. In some cases, the location may need to be specified and/or controlled at points along a specific trajectory.

As defined and used herein, "kinematic mounting" relates to attaching two bodies, which may be called a base assembly and a payload assembly, together by forming a structural path and creating stiffness between the two bodies in six, and only six, independent degrees of freedom ("DOFs") or directions. Each degree of freedom (DOF) kinematically controlled between two bodies is also a position defined, i.e., a specific value of that DOF, as a linear measurement, may be maintained. Six DOFs are desired because the location of any object in space is defined by three orthogonal coordinates, and the attitude of the object is defined by three orthogonal rotations.

A kinematic support has the advantage of being stiff, yet any strains or distortions in the base assembly are not communicated to the payload assembly. Thus, any sensitive optical alignments are not altered in the payload assembly if the base assembly undergoes deformation due to applied loads or bulk temperature changes.

In one embodiment, it is desirable to tailor a DOF based on the configuration of a "pseudo-kinematic" support. "Pseudo-kinematic" means that although there may be many DOFs connecting at least two bodies, such as two micromachined passive alignment assemblies, in a practical attachment scheme, the DOFs can be tailored such that only six DOFs have a relatively high stiffness, and substantially all other DOFs have a relatively low stiffness. Thus, true "kinematic" support means only 6 stiff DOFs connecting two parts, and no other stiffness paths exist. "Pseudo-kinematic" means there are 6 DOFs with relatively high stiffness, and possibly many more with much lower stiffness (typically two to three orders of magnitude less). In some applications, it is desirable to have pseudo-kinematic DOFs with relatively low stiffness to be two to three orders of magnitude lower than DOFs with relatively high stiffness.

DOFs with different levels of stiffness may be accomplished using a flexure system to relieve stiffness in unwanted DOFs. Depending on the cross-sectional properties of elements in the flexure system, connecting elements between two bodies may attain the desired stiffness connectivities.

A connecting element may be configured to restrain the base assembly and the payload assembly with one or more desired DOFs. In some embodiments, a "degenerate" support or connecting element may be used where less than six constrained DOFs between a base and payload are desired. The degenerate support may allow some trajectory (i.e., a combination of Cartesian DOFs) of a payload assembly relative to a base assembly to be unconstrained. A "redundant" support or connecting element may be used to further control the trajectory of a payload assembly relative to a base assembly.

One aspect of the invention relates to an assembly configured to position at least one optical element along a pre-determined trajectory to form a motion control stage. This is achieved by using a "degenerate" support or connecting element that constrains the payload assembly in less than six DOFs. As a result, there is a trajectory of the payload assembly relative to the base assembly that is unconstrained or resisted by soft DOF(s) from the pseudo-kinematic connecting elements. The optical element may be positioned at different parts of the trajectory by providing an external force that moves the optical element to a particular point in the trajectory.

For example, in the case of an assembly configured to constrain an optical element in all but one translational DOF, the optical element is able to move along a nearly linear trajectory. The stiffness for the constrained DOFs will ideally be much higher than for the unconstrained DOF. In this case, a small amount of force is required to move the optical element in the unconstrained linear trajectory. At any point along the trajectory, the position of the payload is determined with high precision due to the kinematic or pseudo-kinematic design.

Another aspect of the invention relates to using redundant DOFs to further control the trajectory of the optical element. In this case, a partially-degenerate support is provided where at least one constrained DOF is redundant with another and the pair of redundant constrained DOF provide substantially counterbalancing forces on the payload during motion along the unconstrained trajectory.

Another aspect of the invention relates to modifying the support structure to reduce the stiffness of constrained redundant DOFs during motion along a trajectory so as to reduce the effect of geometric coupling of the redundant DOF and the unconstrained DOF during motion of the payload along the trajectory. This can be used to reduce the stiffness along the unconstrained DOF, to reduce the stress in the supporting elements during motion along the trajectory, or to increase the range of motion of the motion control stage along the trajectory.

Another aspect of the invention relates to adding a secondary connecting element between intermediate points on at least two connecting elements of the support structure to substantially increase the stiffness of undesired payload trajectories while leaving substantially unconstrained the desired payload trajectory.

Another aspect of the invention relates to a method of making a micromachined flexure assembly in a structure that is a part of a motion control stage. The method comprises using lithography to form a pattern on a substrate for the structure. The pattern outlines a set of connecting elements and a center stage coupled to the set of connecting elements. The method further comprises etching the substrate to form the structure according to the pattern.

BRIEF DESCRIPTION OF THE DRAWINGS

FIG. 10A is a top plan view of a prior art motion control stage, before displacement of the payload relative to the stator thereof;

FIG. 10B is a top plan view of the prior art motion control stage of FIG. 10A, after displacement of the payload relative to the stator;

FIG. 11A is a top plan view of another prior art motion control stage, before displacement of the payload relative to: the stators;

FIG. 11B is a top plan view of the prior art motion control stage of FIG. 11A, after displacement of the payload relative to the stators;

FIG. 13A is a top plan view of a motion control stage incorporating an exemplary embodiment of a secondary connecting element in accordance with the present invention, in which a secondary connecting element of the flexure is shown encircled;

FIG. 13B is an enlarged detail view of the encircled secondary connecting element of the flexure of FIG. 13A;

FIG. 14A is a top plan view of a stage assembly incorporating another exemplary embodiment of a connecting element in accordance with the present invention, in which the secondary connecting element of the flexure is shown encircled;

FIG. 14B is an enlarged detail view of the encircled secondary connecting element of the flexure of FIG. 14A;

FIG. 15A is a top plan view of a stage assembly incorporating another exemplary embodiment of a connecting element in accordance with the present invention, in which the secondary connecting element of the flexure is shown encircled;

FIG. 15B is an enlarged detail view of the encircled secondary connecting element of the flexure of FIG. 15A;

FIG. 16A is a top plan view of a stage assembly incorporating another exemplary embodiment of a connecting element in accordance with the present invention, in which the secondary connecting element of the flexure is shown encircled;

FIG. 16B is an enlarged detail view of the encircled secondary connecting element of the flexure of FIG. 16A;

DETAILED DESCRIPTION

Figure 1A:
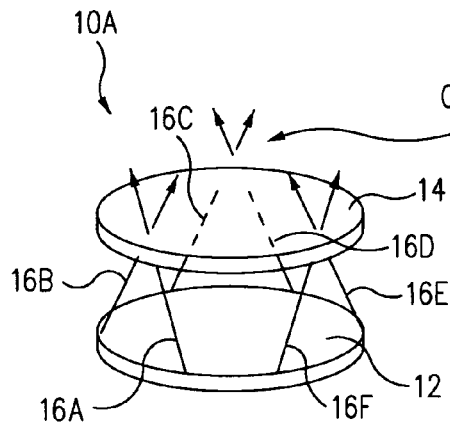
FIG. 1A is a perspective view of an exemplary embodiment of a kinematic support configuration in accordance with the present invention.

FIG. 1A is a three-dimensional schematic view of a kinematic support configuration 10A. The kinematic support configuration 10A of FIG. 1A comprises a base assembly 12, a payload assembly 14 and six monopod connecting elements 16A-16F (individually or collectively referred to herein as "monopod connecting elements 16"). In one configuration, the base assembly 12 comprises a base support structure, and the payload assembly 14 holds or aligns an optical element, such as an optical fiber, lens or mirror. The base assembly 12 is connected to the payload assembly 14 via the six monopod connecting elements 16A-16F.

Each monopod connecting element 16 of FIG. 1A constrains one degree of freedom (hereinafter referred to as 'DOF') between the base assembly 12 and the payload assembly 104, as shown by an arrow above the kinematic support configuration 10A of FIG. 1A. A constrained DOF may be referred to as a 'stiff' DOF or a restrained DOF. The relevant reference parameter for translational stiffness or translational DOF is force, while the relevant reference parameter for rotational stiffness or rotational DOF is torque.

Figure 1B:
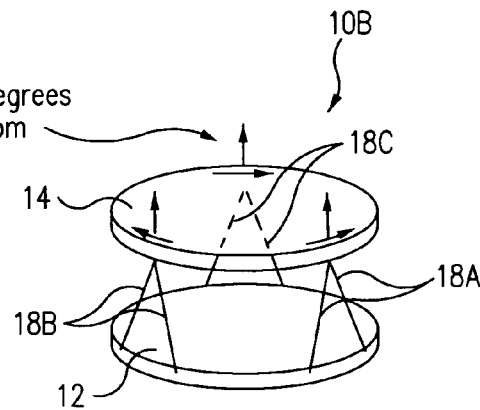
FIG. 1B is a perspective view of another exemplary kinematic support configuration.

FIG. 1B is a three-dimensional schematic view of another kinematic support configuration 10B. The kinematic support configuration 10B of FIG. 1B comprises a base assembly 12, a payload assembly 14 and three bipod connecting elements 18A-18C (individually or collectively referred to herein as "bipod connecting element 18"). The base assembly 12 is connected to the payload assembly 14 via the three bipod connecting elements 18A-18C. Each bipod connecting element 18 constrains two DOFs between the base assembly 12 and the payload assembly 14, as shown by a pair of arrows near the kinematic support configuration 10B of FIG. 1B. In one embodiment, the kinematic support configurations 10A, 10B each have a structural path between the base assembly 12 and the payload assembly 14 in six independent DOFs, as shown by the arrows in FIGS. 1A, 1B. Six DOFs of constraint may be desired for some optic alignment applications.

The respective kinematic support configurations 10A, 10B of FIGS. 1A and 1B have the advantage of being as stiff as the respective connecting elements 16A-16F, 18A-18C, but any strain or distortion in the base assembly 12 will not be transferred to the payload assembly 14 (although a positional or attitude change may occur). Thus, any sensitive optical elements aligned within the payload assembly 14 will not be affected if applied loads or bulk temperature changes deform the base assembly 12.

Similarly, if the payload 14 grows or shrinks, there will be no forces transferred to the base assembly 12 because of the connecting elements 16A-16F, 18A-18C. But there may be a change in position or attitude between the base 12 and the payload 14. For the symmetric support configurations shown in FIGS. 1A and 1B, the only change is in the vertical direction between the two bodies 12, 14. The payload 14 may be rigidly supported and maintains position in the presence of environmental conditions, such as inertial loads.

The location of an object in space is defined by three orthogonal coordinates or vectors, and the attitude of the object is defined by three orthogonal rotations with respect to the three vectors. In accordance with the present invention, if the components of an assembly (e.g., base, payload, and connecting structure such as bipods or monopods) are formed using an extremely precise fabrication method (e.g., micromachining), then the location and attitude of a payload relative to a base may be specified as precisely by fabricating connecting structure to calculated dimensions along their support DOF(s) (e.g., a precise length for a monopod, or a precise vertical and horizontal point of contact for a bipod).

Degenerate Support

If there are fewer than six DOFs constrained between the base 12 and the payload 14, there may be some trajectory, i.e., combination of Cartesian DOFs, of the payload 14 relative to the base 12 that is unconstrained. In this case, the support between the base 12 and the payload 14 may be called "degenerate," and may occur when a connecting element 16 or 18 is missing or when certain connecting elements 16, 18 are parallel. Arbitrarily complex patterns of motion may be created or controlled by replacing one linear connecting element 16 or 18 with a linear actuator.

Redundant Support

If there are more than six DOFs constrained between the base 12 and payload 14, and the base 12 distorts or warps, there will be no solution of payload position and attitude that does not also warp the payload 14. This type of support may be called "redundant."

Redundant DOF

In some cases for both degenerate and redundant support, two or more connecting elements may constrain the same DOF. This may occur when certain connecting elements 16, 18 are constraining the payload 14 in the same way, such that removal of one of these connecting elements would not substantially affect the static position of the payload 14 with respect to the base 12. In this case, the support is said to have a "redundant DOF".

Monopods and Bipods

Figure 2A:
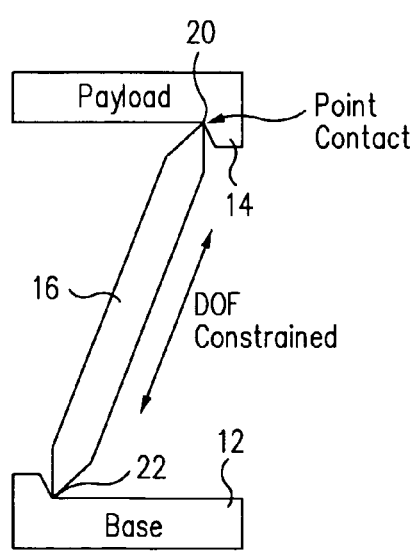
FIG. 2A is an elevation view of a monopod connecting element of the kinematic support configuration of FIG. 1A.

FIG. 2A is a partial elevation view of the monopod connecting element 16 shown in FIG. 1A. The monopod connecting element 16 of FIG. 2A constrains the base and payload assemblies 12, 14 with point contacts 20, 22 at two ends.

Figure 2B:
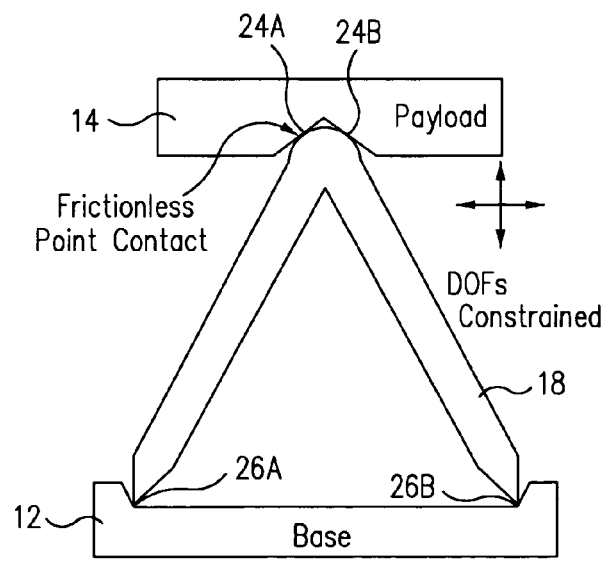
FIG. 2B is an elevation view of a bipod connecting element of the kinematic support configuration of FIG. 1B.

FIG. 2B is partial elevation view of the bipod connecting element 18 of FIG. 1B. The bipod connecting element 18 of FIG. 2B constrains the base and payload assemblies 12, 14 with one or more (ideally) frictionless point contacts 24A, 24B at one end, and two point-contacts 26A, 26B at the other end.

The DOFs restrained by the respective monopod and bipod connecting elements 16, 18 are indicated by arrows in FIGS. 2A and 2B. Six monopod connecting elements 16A-16F may constrain six DOFs between the base and payload assemblies 12, 14, as shown by the arrows in FIG. 1A. Also, three bipod connecting elements 18A-18C may constrain six different DOFs between the base and payload assemblies 12, 14, as shown by the arrows in FIG. 1B.

Both types of joints (i.e., the point-in-groove joint of FIG. 2A and the circle-in-groove joint of FIG. 2B) may be used interchangeably. A preload may be used to maintain contact between the base 12, connecting element 16 or 18, and payload 14 of FIGS. 2A and 2B.

Micromachining

The base and payload assemblies 12, 14 and the connecting elements 16A-16F, 18A-18C of FIGS. 1A, 1B, 2A and 2B may be hereinafter referred to collectively as a "micromachined passive alignment assembly" or a "micromachined assembly." Other micromachined alignment assemblies are described below. A micromachined assembly may be designed, formed and assembled using the methods described below with reference to FIGS. 7-9.

In general, each component of the micromachined assembly of FIGS. 1A, 1B, 2A and 2B may be formed by first using a patterning process, such as lithography or photolithography, to form a desired pattern on a substrate wafer. The substrate wafer may comprise silicon or another suitable material, such as gallium arsenide or germanium. The lithography process may include applying a resist on a surface of a substrate wafer, aligning a mask with a desired pattern above the substrate wafer, exposing the resist to radiation, developing the resist, and hardbaking the resist.

The radiation used for patterning the substrate wafer may include, by way of example, an ultraviolet light, an X-ray beam, or a beam of electrons. In one embodiment, the mask is made of a mechanically rigid material that has a low coefficient of thermal expansion. For example, the mask may be made of quartz, borosilicates, metallic chrome, or iron oxide. Patterning may be accomplished using either negative or positive resists. In some applications, it is desirable to use positive resists with aspect ratios above unity. In some applications, a photolithographic process is used to form a desired pattern on the substrate wafer. In a photolithography process, a photoresist such as photo-sensitive film is used in the patterning process.

After developing a pattern on the resist, one or more micromachining fabrication processes, such as Deep Reactive Ion Etching (DRIE), Wire Electric Discharge Machining (Wire EDM or WEDM), LIGA (X-Ray lithographic, galvanoformung, und abformtechnik) (X-Ray lithography, electrodeposition, and molding), or SCREAM (Single Crystal Reactive Etching and Metallization) may be used to etch the substrate wafer according to the masked pattern. In some applications, it is desirable to etch deep and straight sidewalls in the substrate wafer. In other applications, it is desirable to form a three-dimensional structure from the patterned wafer.

After etching, the patterned wafer is cleansed. The photoresist and/or resist may be removed using a solvent such as acetone. If there are other fragile MEMs structures on the wafer, a plasma etch may also be used to clean the substrate wafer.

Figure 7:
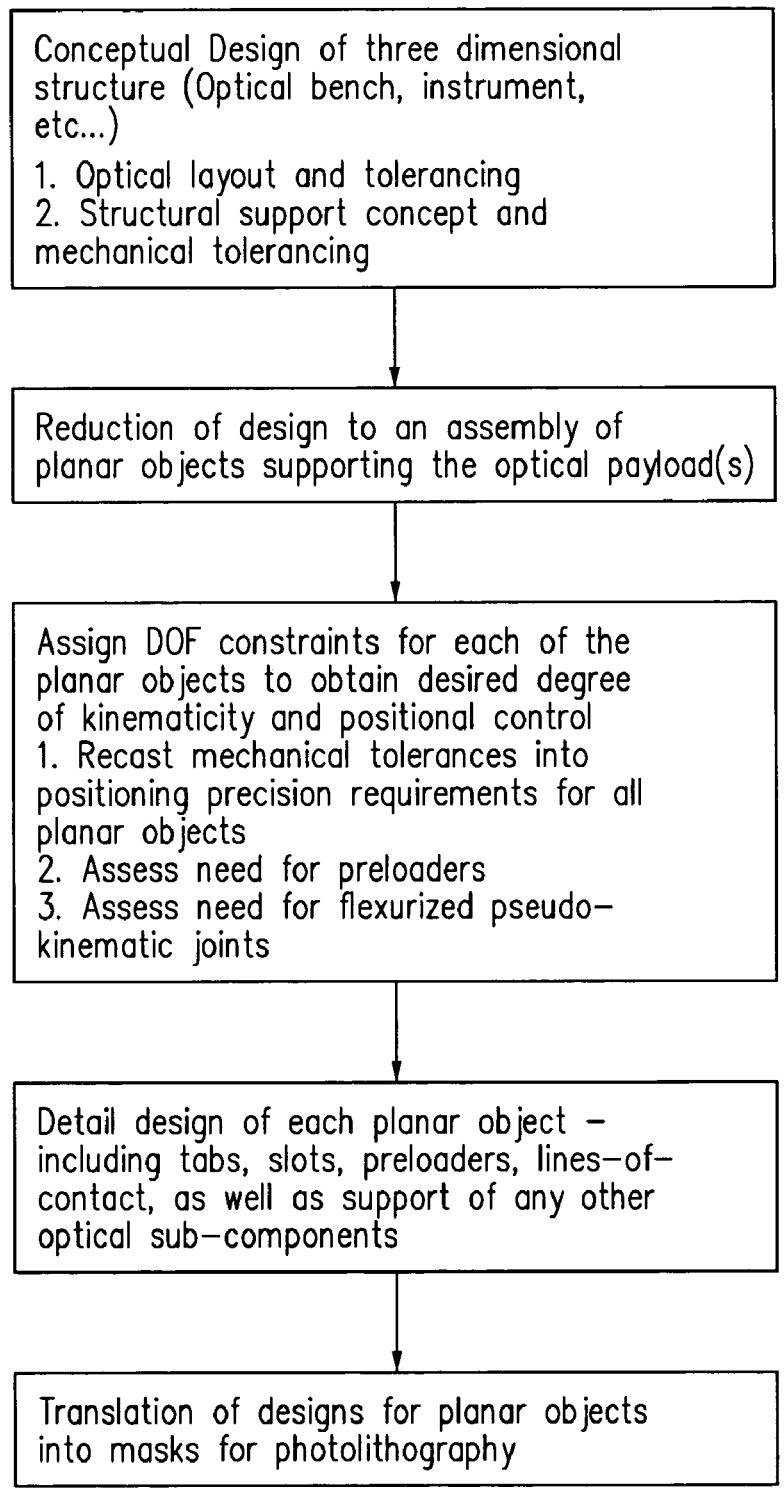
FIG. 7 is a flow chart of an exemplary method for designing the three-dimensional structures and assemblies of the present invention, and for translating such designs into masks for high precision microlithography/photolithography.
Figure 8:
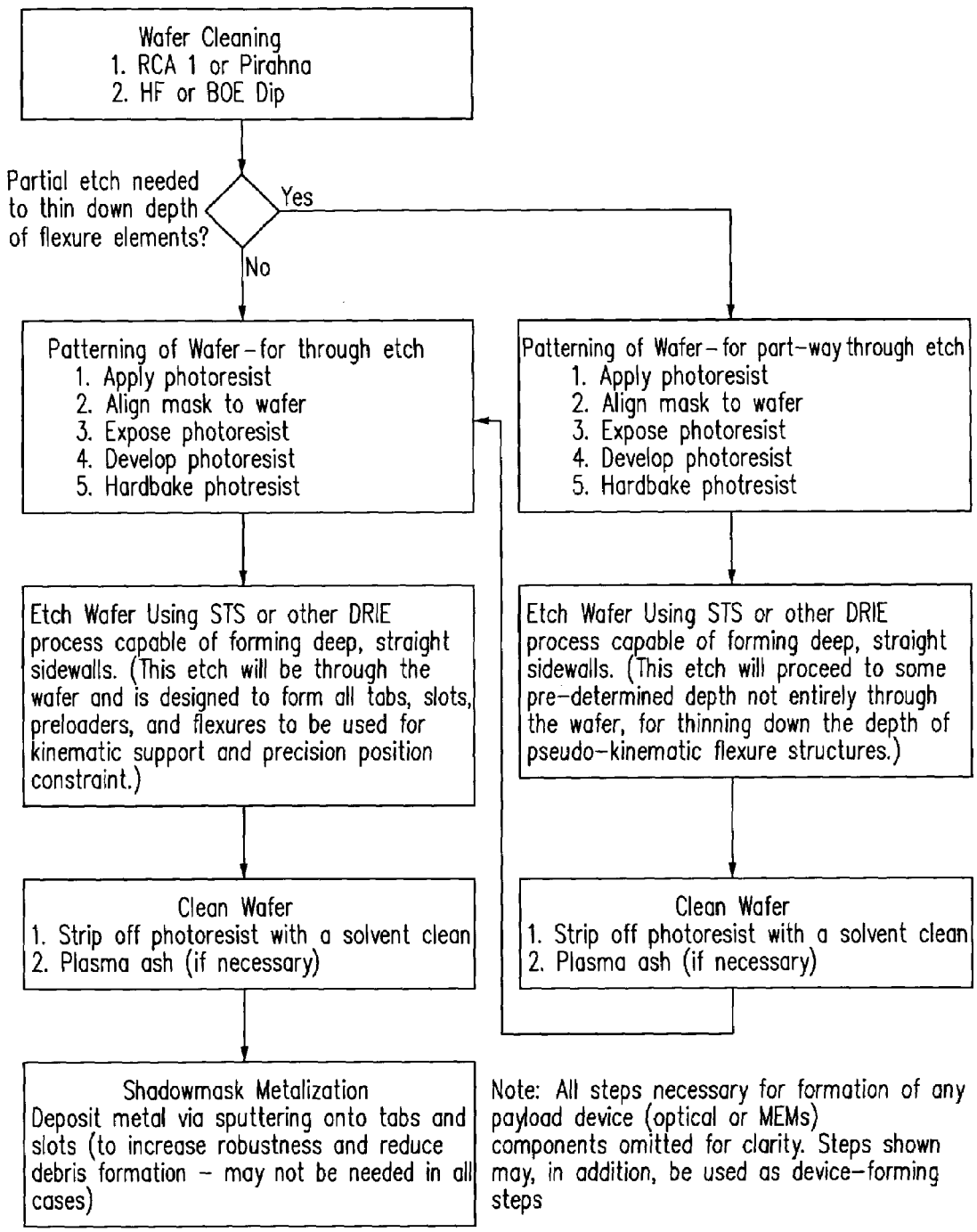
FIG. 8 is a flow chart of an exemplary method for making the high precision, three-dimensional structures of the present invention.
Figure 9:
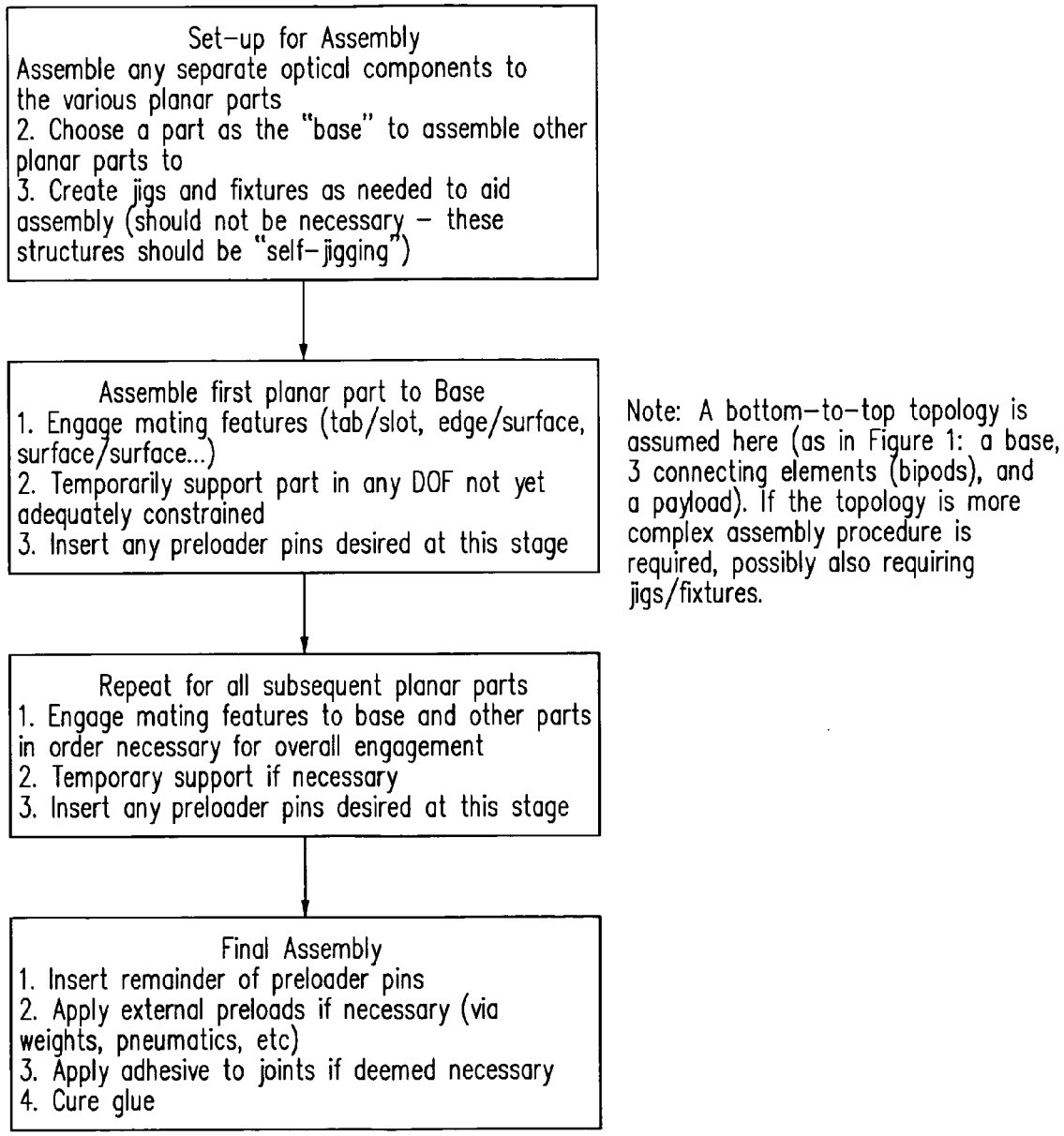
FIG. 9 is a flow chart of an exemplary method for assembling the three-dimensional structures of the present invention.

After the fabricated components are cleansed, the components are assembled to form a desired micromachined passive alignment assembly. The fabrication processes described above may be used for making any part, element, patterned wafer, or component of the micromachined passive alignment assemblies described herein. FIGS. 7-9 provide additional details on component micromachining design, fabrication and assembly in accordance with the present invention.

Alternative manufacturing methods exist in the prior art, whereby any of the structures described herein can be manufactured using a variety of such methods, including injection molding, computer numerical control (CNC) machining, metal stamping, hot embossing, and electro-discharge-machining (EDM).

Figure 3:
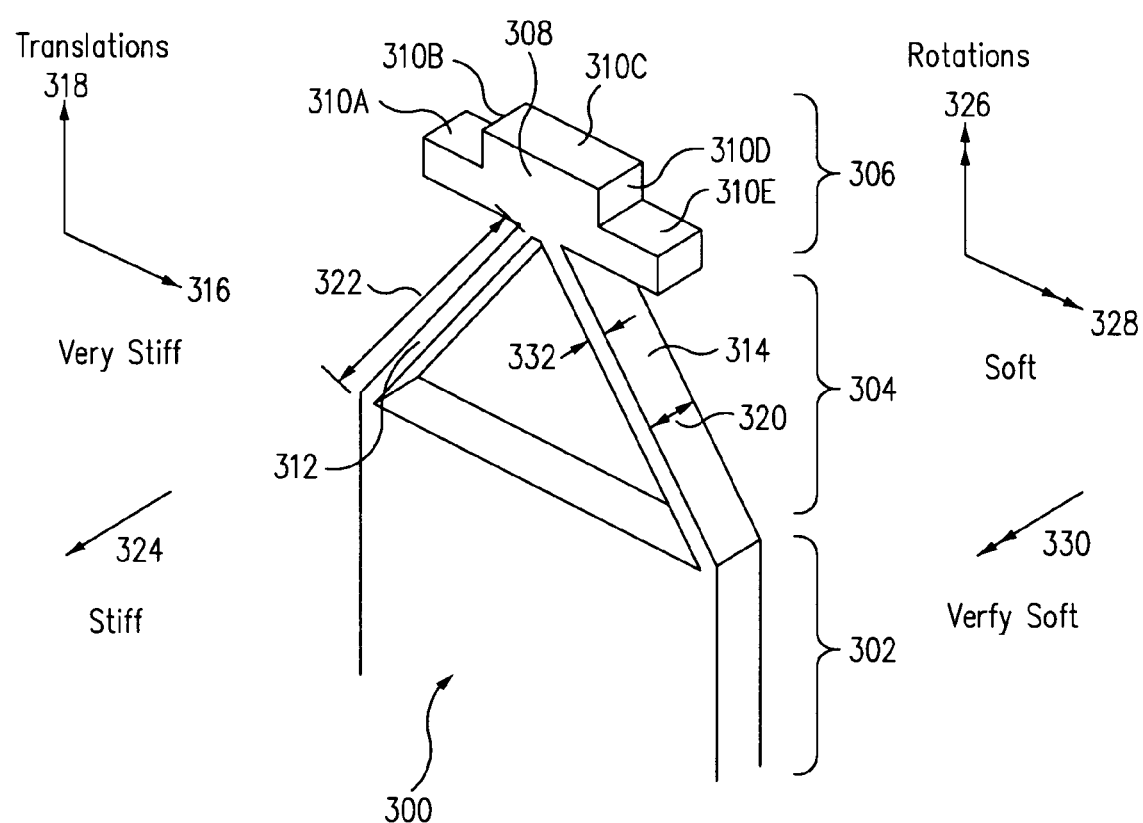
FIG. 3 is a partial perspective view of an exemplary embodiment of a stiffness control flexure system and attachment portion in accordance with the present invention.

Pseudo-Kinematic Connecting Element, Flexure Systems, Ball Joints, Attachment Points FIG. 3 is a partial perspective view of one embodiment of a pseudo-kinematic connecting element flexure system and an attachment point 300. "Pseudo-kinematic" means that, although there may be many DOFs connecting at least two bodies through a plurality of connecting elements, such as two micromachined passive alignment assemblies, in a practical attachment scheme, the DOFs can be tailored such that only six DOFs have a relatively high stiffness, and substantially all other DOFs have a relatively low stiffness. In some applications, it is desirable to have at least one DOF with low stiffness to be two to three orders of magnitude lower than a DOF with high stiffness. DOFs with different levels of stiffness may be accomplished using a flexure system, such as the flexure system 300 of FIG. 3, to relieve stiffness in unwanted DOFs. Hereinafter, "kinematic" may be used to refer to pseudo-kinematic attachments.

In FIG. 3, the pseudo-kinematic connecting element flexure system and attachment point 300 comprises a body 302, a flexure system 304, and an attachment portion 306. The flexure system 304 couples the body 302 to the attachment portion 306. The attachment portion 306 and the flexure system 304 may be collectively referred to herein as a "ball joint," a "ball joint flexure" or a "flexured ball joint" in a planar structure. A ball joint is a useful pseudo-kinematic structure that is relatively stiff in substantially all translations and relatively soft in substantially all rotations.

One embodiment of the attachment portion 306 of FIG. 3 comprises a mounting tab 308 with mating surfaces (contact surfaces) 310A, 310B, 310D, 310E, which may provide high precision dimensional control to mating elements. The flexure system 304 comprises two flexure elements 312, 314 that form a bipod-like structure. Each flexure element 312, 314 is very stiff in at least an axial direction. Thus, each flexure element 312, 314 provides a very stiff connection between the attachment portion 306 and the body 302 in DOFs 316 and 318, as shown in FIG. 3.

Depending on the cross-sectional properties of the flexure system, the connecting elements may have compliant (or "soft") rotations become stiff and stiff translations become soft. The cross-sectional properties of the flexure elements 312, 314 include blade depth 320, blade length 322, and blade thickness 332. If the blade depth 320 of the flexure elements 312, 314 is significantly smaller (e.g., less than 1/10) than the blade length 322, the attachment of the body 302 to the attachment portion 306 by the flexure elements 312, 314 may have two stiff DOFs 316, 318 (i.e., forming a bipod), and other relatively softer DOFs 324, 326, 328, 330.

In other applications, if the flexure elements 312 and 314 have a blade depth 320 that is significant (e.g., greater than about 1/10 of the blade length 322), then DOF 324 has significant stiffness, and the attachment has the properties of a ball joint. The rotational DOFs 326, 328 may become stiffer compared to DOF 330, which is primarily controlled by the flexure blade width 332. In one embodiment, DOFs 326, 328 are soft and DOF 330 is very soft compared to DOFs 316, 318. Depending on the exact magnitude and the sensitivity of a particular design, the soft DOFs 326, 328 may not cause any problems.

The stiffness of DOFs is highly dependent on the exact cross-sectional properties (blade depth 320, length 322, and thickness 332) of the flexure elements 312, 314. It would be relatively easy to make the "soft" rotational DOFs 326, 328 stiffer and make the "stiff" translation 324 softer by changing the cross-sectional properties. As long as the blade length 322 is much greater than the blade depth 320 and the blade thickness 332, e.g., a 10 to 1 ratio (other ratios may be used), the "very stiff" translations 316 and 318 and the "very soft" rotation 330 will remain unchanged for this configuration.

In one configuration, it is desirable to have a ball joint at both ends of the body 302 to form a monopod connecting element (not illustrated). This configuration would create an appropriate set of stiff DOFs to make the monopod connecting element act like a single DOF constraint between two bodies.

Design/Fabrication Considerations

Since the alignment features of the connecting element 300 discussed above are all coplanar lines, a mask with the desired pattern can be made for the patterning process (e.g., lithography). The patterning process can locate alignment features with high precision in a substrate wafer plane immediately adjacent to the mask.

In some applications, it may be important to consider two design and fabrication points for the connecting element 300 of FIG. 3. First, the mask sides or regions of a substrate wafer intended to form mating features should be substantially in contact with the mask sides of other elements for highest precision. For example, for highest precision, the mask sides of the feature should be the upper surface of the base assembly (e.g., 12 of FIGS. 1A, 1B) and a lower surface of the payload assembly (e.g., 14 of FIGS. 1A, 1B).

Second, a micromachining process may either etch (cut) through the substrate wafer in a perfectly perpendicular manner or with a draft (e.g., inward draft). Etching the substrate in a perfectly perpendicular manner is the ideal case. If drafting occurs, it is recommended to have an inward draft with acute angles measured from the mask plane to the etched sides of the substrate wafer. It may be important to ensure contact at the masked side of the substrate wafer. In one embodiment, the amount of draft should be as small as practical, such as just enough draft to ensure there is nothing beyond a perpendicular cut (outward draft; obtuse angle) within the error of the micromachining process. For example, in one configuration, the draft is half a degree.

As a result of inward drafts, some of the ideal line contacts may be reduced to point contacts with very shallow angles. The mating surfaces for the base assembly, the payload assembly and the connecting element 300 may all experience drafts. Thus, the respective mating surfaces of the features (which define lateral position reference line segments) may actually be contact points on the mask sides of the base assembly and the payload assembly. Inward drafting may be acceptable because the two planes of two mating surfaces, which coincide at a point contact, form a very acute angle. Thus, if a load is applied, a substantial contact path may be formed, and hence, result in reasonable contact stresses.

Pseudo-Kinematic vs. Partially-Degenerate Support

Figure 4:
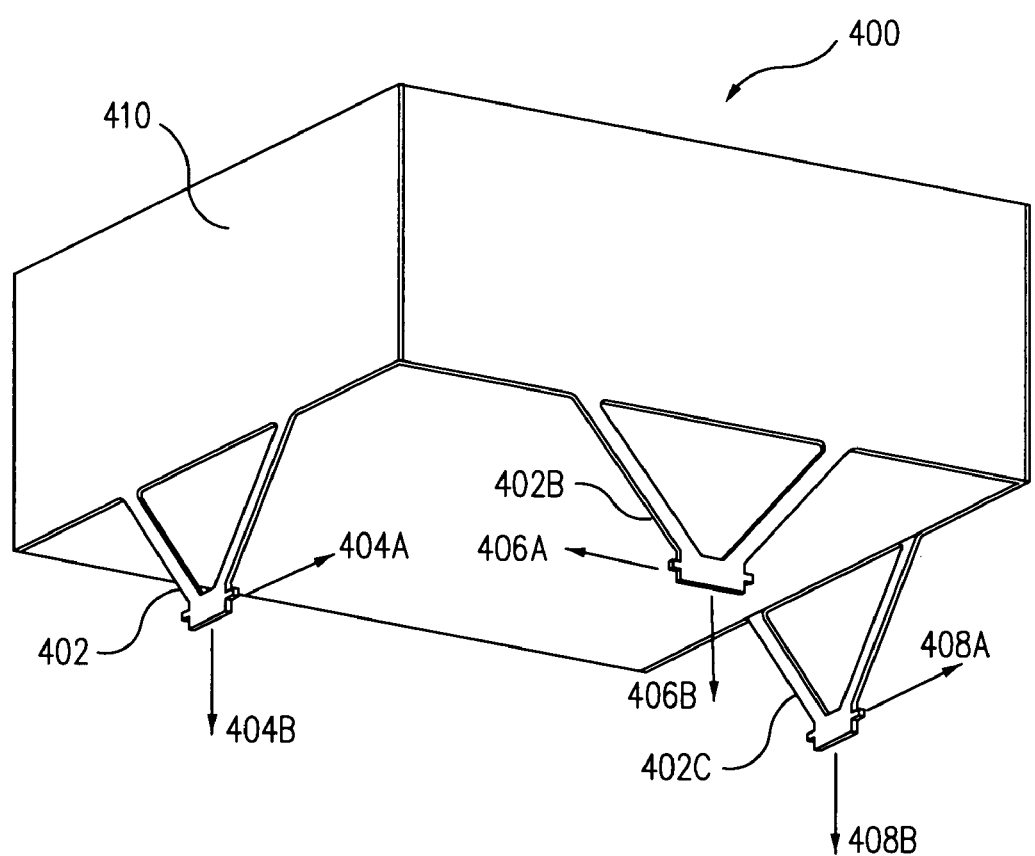
FIG. 4 is a perspective view of an exemplary embodiment of a pseudo-kinematic support system in accordance with the present invention.
Figure 5:
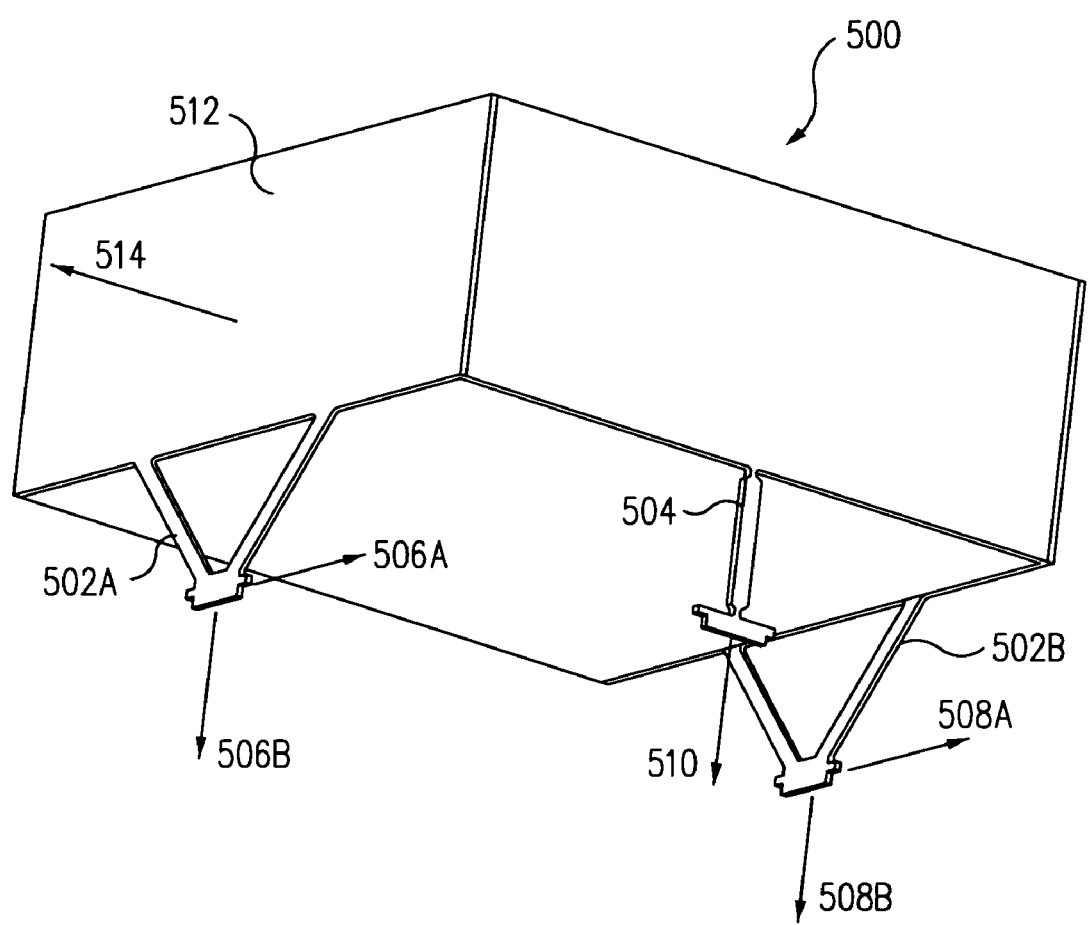
FIG. 5 is a perspective view of an exemplary embodiment of a partially-degenerate support system in accordance with the present invention.
Figure 6:
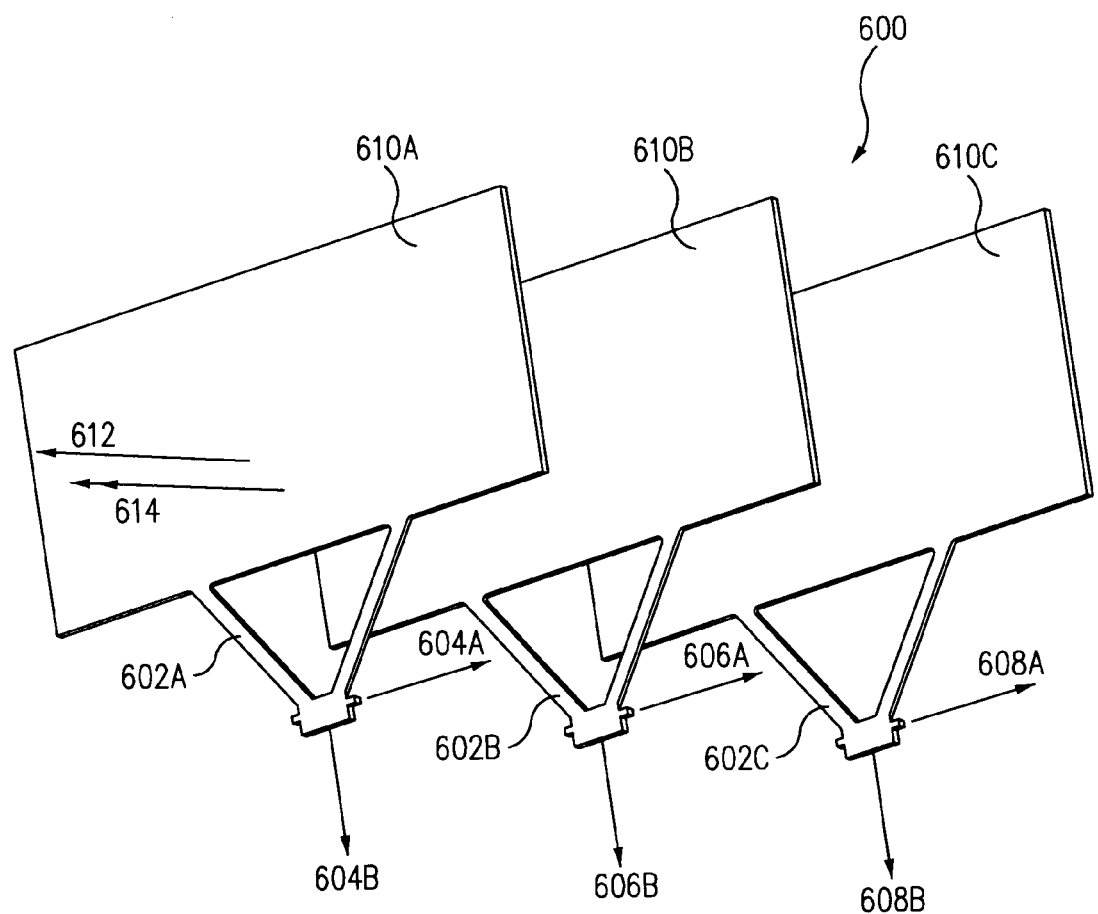
FIG. 6 is a perspective view of another exemplary embodiment of a partially-degenerate support system in accordance with the present invention.

FIGS. 4, 5 and 6 illustrate the difference between a pseudo-kinematic support system and partially-degenerate support systems. FIG. 4 is a perspective view of one embodiment of a pseudo-kinematic support system 400. The pseudo-kinematic support system 400 of FIG. 4 comprises a box-like structure 410 and three pseudo-kinematic, planar, bipod connecting elements 402A-402C (referred to as "bipod connecting elements"). Each bipod connecting element 402 may have two stiff or very stiff DOFs. For example, bipod connecting element 402A has two stiff DOFs 404A-404B. Bipod connecting element 402B has two stiff DOFs 406A-406B. Bipod connecting element 402C has two stiff DOFs 408A-408B. Thus, the bipod connecting elements 402A-402C may constitute a complete support (six stiff DOFs) for the box-like structure 410 (e.g., base assembly or payload assembly). The remaining DOFs (not shown in FIG. 4) may be soft. To determine whether or not a set of support DOFs is kinematic, redundant, or degenerate, the directions and points of application of each set of support DOFs should be considered. Kinematic may also be referred to as "determinate" or "statically determinate." Redundant may also be referred to as "indeterminate" or "statically indeterminate."

In some applications, it is desirable to have a degenerate support system, for example, when building a motion control stage. A degenerate support system constrains base and payload assemblies with less than six DOFs. As a result, there may be some trajectory (i.e. combination of Cartesian DOFs) of the payload assembly relative to the base assembly that is unconstrained. A degenerate support system may occur when a connecting element is missing or when certain connecting elements are parallel.

Although a degenerate support and a partially-degenerate support constrain base and payload assemblies with less than six DOFs, a degenerate support will move in some trajectory direction that is unconstrained while a partially-degenerate support will move in some trajectory direction that is resisted by soft DOF(s) from the pseudo-kinematic connecting elements. The trajectory direction of the degenerate support would have no restoring force and zero resonant frequency. Meanwhile, the trajectory direction of the partially-degenerate support would have relatively little restoring force, and a relatively low resonant frequency.

FIG. 5 is a three-dimensional view of one embodiment of a partially-degenerate support system 500. The partially-degenerate support system 500 in FIG. 5 comprises a box-like structure 512, two pseudo-kinematic, planar, bipod connecting elements 502A-502B (referred to as "bipod connecting elements") and one pseudo-kinematic, planar, monopod connecting element 504 (referred to as "monopod connecting element"). While the two bipod connecting elements 502A-502B each have two stiff DOFs 506A-506B, 508A-508B, the monopod connecting element 504 has one stiff DOF 510. Because the bipod connecting elements 502A-502B and the monopod connecting element 504 are pseudo-kinematic, the remaining DOFs (not shown) may be soft.

Since the partially-degenerate support system 500 restrains the structure 512 with five stiff DOFs 506A-506B, 508A-508B, and 510, there may be some trajectory direction 514 for the structure 512. Motion in this trajectory (motion direction) 514 is resisted by out-of-plane bending of the bipod connecting elements 502A-502B and in-plane or out-of-plane bending of the monopod connecting element 504, which are all fairly soft DOFs. Motion along trajectory direction 514 would therefore have little restoring force, and thus would have a low resonant frequency. The compliance in trajectory direction 514 would also mean any precise positioning features designed to control motion along the trajectory direction 514 may have degraded performance.

FIG. 6 is a perspective view of another embodiment of a partially-degenerate support system 600. The partially-degenerate support system 600 comprises three connecting plates 610A-610C and three pseudo-kinematic, planar, bipod connecting elements 602A-602C (referred to as "bipod connecting elements 602A-602C"). Each bipod connecting element 602A-602C has two stiff or very stiff DOFs. For example, bipod connecting element 602A has two stiff DOFs 604A-604B. Bipod connecting element 602B has two stiff DOF 606A-606B. Bipod connecting element 602C has two stiff DOF 608A-608B.

In one embodiment, where the three plates 610A-610C are rigidly attached to each other, the system 600 has a total of six stiff DOFs 604A-604B, 606A-606B, 608A-608B. The remaining DOFs (not shown) may be soft.

Because the attachment points of the three bipod connecting elements 602A-602C are collinear, one bipod connecting element 602A may be ineffective. Thus, the three connecting plates 610A-610C with three bipod connecting elements 602A-602C may have only four stiff DOFs, including two trajectory-directions 612 and 614 with very low stiffness.

Motion Control Stage

As described above, a degenerate support system may be used to construct a motion control stage. The aforementioned embodiments of FIGS. 5 and 6 are two examples thereof. In some applications, it is desirable to have a more compact motion control stage that eliminates the need to assemble structures in three dimensions. In these cases, the bipod connecting element may be replaced by a high aspect ratio "flexure." This enables the creation of motion control stages that are substantially two dimensional, or flat. A high aspect ratio flexure ("blade flexure") has three stiff DOFs and three soft DOFs. These blade flexures have been used in the prior art to form motion control stages, as shown in FIGS. 10A, 10B and 11A, 11B, but the invention described herein provides for significant improvements in the control of the motion and the range of travel of the stages by taking advantage of the pseudo-kinematic principles taught herein. Thus, in FIG. 10A, a prior art motion control stage 100 has the payload 106 attached to the base 104 using two blade flexures 102. As shown in FIG. 10B, the relatively unconstrained DOF provides for a circular, or arcuate, trajectory that is not precisely linear. In other words, the trajectory is along a combination of two DOFs, rather than along a single DOF. As shown in FIGS. 11A-11B, a prior art double parallel flexure 110 addresses the problem of arcuate motion of the stage 116, but it geometrically couples the stiff DOF to the unconstrained DOF, resulting in a nonlinearity in the stiffness of the unconstrained DOF. As a result, the travel of the stage along the trajectory is limited because either the stiffness is too high (compared with other DOFs), or the stress in the flexures is so high that it causes them to fracture.

One aspect of the present invention relates to an assembly configured to position at least one optical element along a pre-determined trajectory to form a motion control stage. This is achieved by using a "degenerate" support or connecting element that constrains the payload assembly in less than six DOFs. As a result, there is a trajectory of the payload assembly relative to the base assembly that is unconstrained or resisted by soft DOF(s) from the pseudo-kinematic connecting elements. The optical element may be positioned at different parts of the trajectory by providing an external force that moves the optical element to a particular point in the trajectory.

For example, in the case of an assembly configured to constrain an optical element in all but one translational DOF, the optical element is able to move along a nearly linear trajectory. The stiffness for the constrained DOFs will ideally be much higher than for the unconstrained DOF. In this case, only a small amount of force is required to move the optical element in the unconstrained linear trajectory. At any point along the trajectory, the position of the payload is determined with high precision due to the kinematic or pseudo-kinematic design.

Another aspect of the invention requires redundant DOFs which are used to further control the trajectory of the optical element. In other words, a partially-degenerate support member is provided in which at least one constrained DOF is redundant with another, and the redundant pairs of constrained DOFs provide substantially counterbalancing forces on the payload during motion along the unconstrained trajectory. As a result of the counterbalancing force, the trajectory can be desirably modified. For example, the redundant DOF can be used to increase the straightness of the motion for a linear motion control stage. An example of this application is shown in FIG. 6.

Another aspect of the invention relates to modifying the support structure to reduce the stiffness of constrained redundant DOFs during motion along a trajectory so as to reduce the effect of geometric coupling of the redundant DOF and the unconstrained DOF during motion of the payload along the trajectory. This reduces the nonlinearity in the stiffness along the unconstrained DOF, reduces the stress in the supporting elements during motion along the trajectory, and increases the range of motion of the motion control stage along the trajectory.

Figure 12:
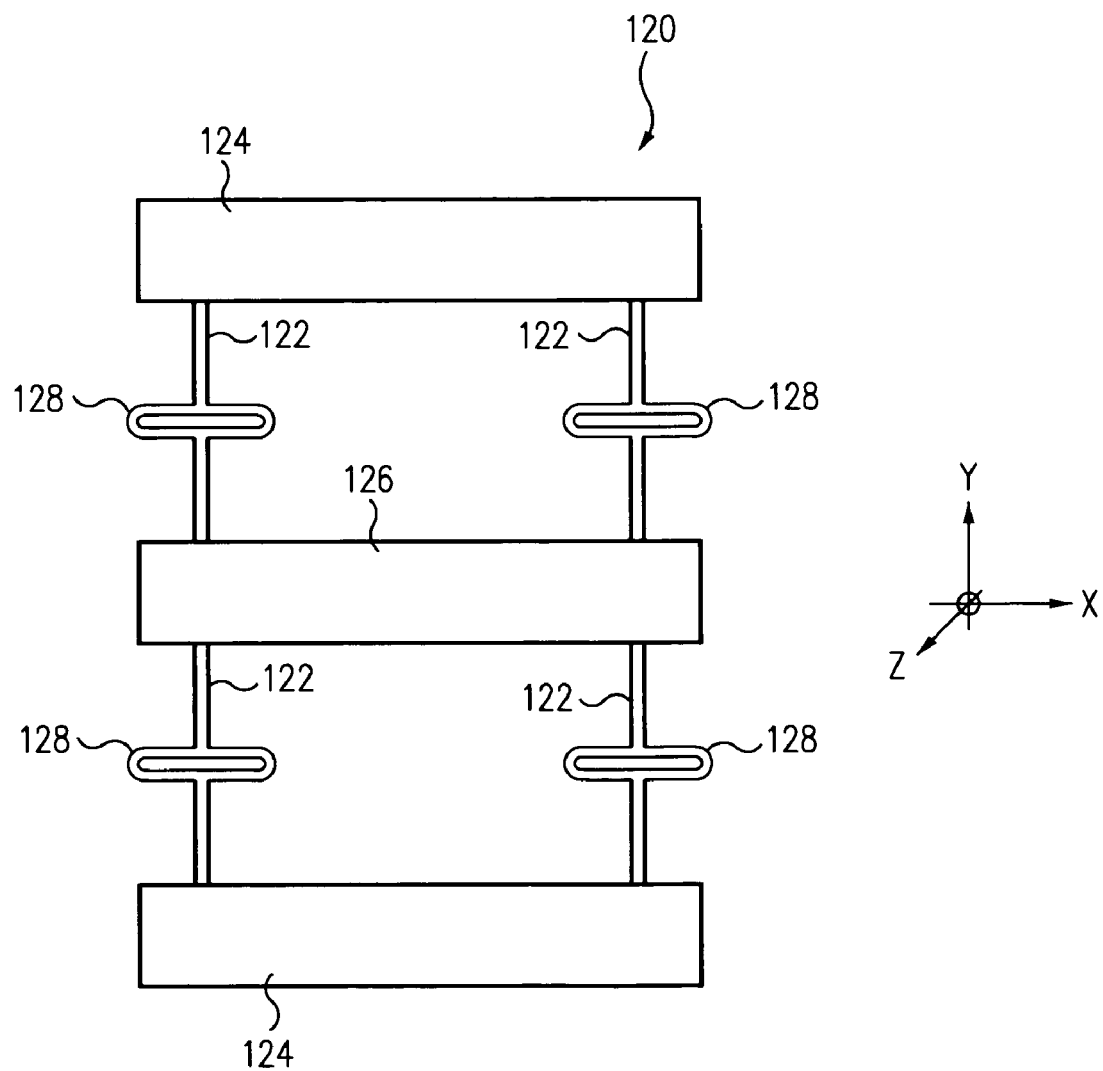
FIG. 12 is a top plan view of a motion control stage incorporating an exemplary embodiment of a flexure with strain relief in accordance with the present invention.

An exemplary embodiment of this aspect of the invention is shown in the plan view of a motion stage assembly 120 of FIG. 12. In this case, additional strain relief features 128 are added to the simple blade flexures 122 to reduce their longitudinal stiffness. This not only reduces the stiffness of the redundant DOFs, but also reduces the effect of geometric coupling of DOFs. As a result, the nonlinearity in the stiffness of the unconstrained DOF is largely eliminated, thereby increasing the range of motion in the unconstrained trajectory while reducing the stiffness in the unconstrained DOF. In the particular embodiment illustrated in FIG. 12, the strain relief features 128 are oval-shaped, i.e., like the letter "O". Alternative embodiments, such as those illustrated in FIGS. 13-23, may have strain relief features 128 shaped like the letter "M", "S", "W", or any other shape that is either radially symmetrical about an axis through the centroid of the strain relief feature and perpendicular to its plane i.e., the Z axis illustrated in the several views), or bilaterally symmetrical about an axis through its centroid and parallel to its plane (i.e., the X axis illustrated). FIG. 13A shows a second exemplary embodiment of the novel blade flexures of the invention. In this case, a payload 136 is supported by four folded-blade flexures 132. By using folded-blade flexures 132, their stiffness along the redundant DOF is substantially reduced, compared with the prior art double parallel flexures shown in FIG. 11A. In this particular embodiment, the strain relief features are also flexures that are connected to the other flexure at an acute angle that is substantially less than 180 degrees. As a result, the same advantages are obtained as described above in connection with the embodiment of FIG. 12.

Another aspect of the invention relates to adding a secondary connecting element between intermediate points on at least two connecting elements of the support structure to substantially increase the stiffness of undesired payload trajectories while leaving the desired payload trajectory substantially unconstrained. During payload motion along an undesired trajectory, intermediate points on two connecting elements move with respect to each other in a first DOF. During payload motion along a desired trajectory, said intermediate points on said two connecting elements move with respect to each other in a second DOF. A secondary connecting element is then used to couple said two intermediate points on said two connecting structures, such that the stiffness in said first DOF is substantially higher than in said second DOF. The result is that the payload is substantially constrained in the undesired trajectory and substantially unconstrained in the desired trajectory.

For example, the motion control stage 136 depicted in FIG. 13A has relatively low stiffnesses in two translational DOFs 501, 502, and one rotational DOF 503, as indicated by the arrows in the figure. If a linear motion stage is desired, then one translational DOF 501 and the rotational DOF 503 must be made considerably stiffer (at least 10×) than that of the desired trajectory DOF 502. During motion of the payload 136 along undesired trajectories 501, 503, intermediate points 138 on the connecting elements 132 (in this case, folded-blade flexures) move in shear with respect to each other, as shown by motion trajectory 504 in FIG. 13B. During motion of the payload 136 along the desired trajectory 502, the intermediate points 138 on the connecting elements 132 move together, undergoing a change only in their spacing, as shown by motion trajectory 506 in FIG. 13B.

Figure 17:
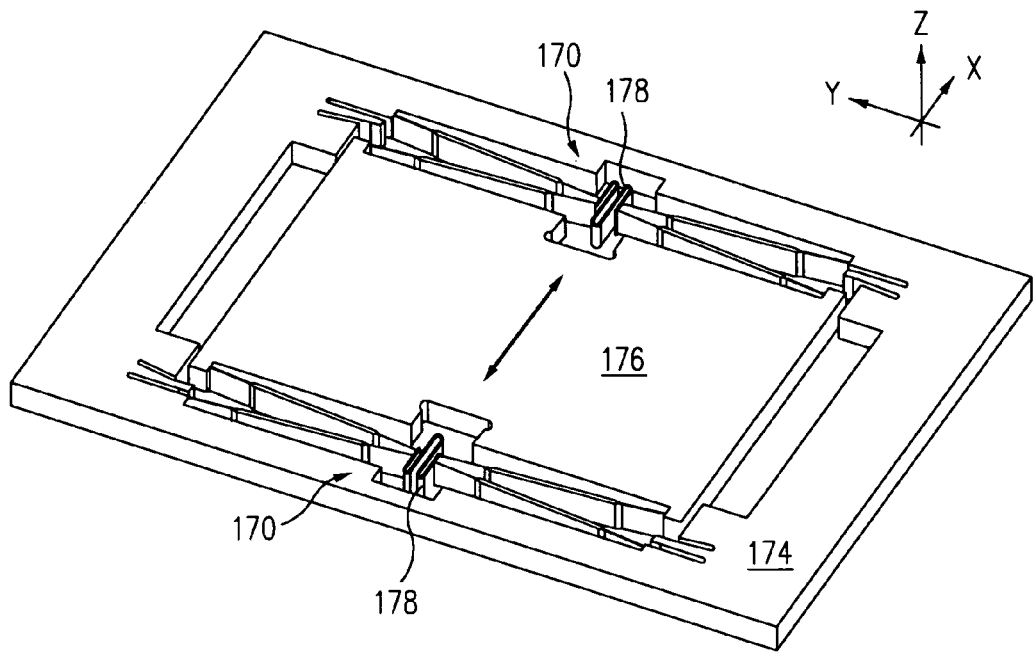
FIG. 17 is a perspective view of the motion control stage of FIG. 14A, in which the stage is shown supported within the opening of a support frame for coplanar, rectilinear movement therein by a pair of connecting elements in accordance with the present invention.

FIGS. 14-17 show various embodiments of the linear motion stage with variously shaped secondary connecting elements 148, 158, 168, respectively, used to increase the stiffness in motion trajectory 504 while minimizing the stiffness in motion trajectory 506. FIGS. 14A, 14B illustrate an embodiment in which the secondary connecting element 148 has the shape of the letter "M". FIGS. 15A, 15B illustrate an embodiment in which the secondary connecting element 158 has the shape of the letter "S". FIGS. 16A, 16B illustrate an embodiment in which the secondary connecting element 168 has the shape of the letter "O". One of ordinary skill in the art will readily appreciate that there exist other possibilities for the shape of the secondary connecting element that would satisfy the requirements outlined by the teachings of the present invention. FIG. 17 is a perspective view of the motion control stage of FIG. 14A. In this view, it is clear that the secondary connecting element 178 in this exemplary embodiment also has a high aspect ratio.

Figure 18:
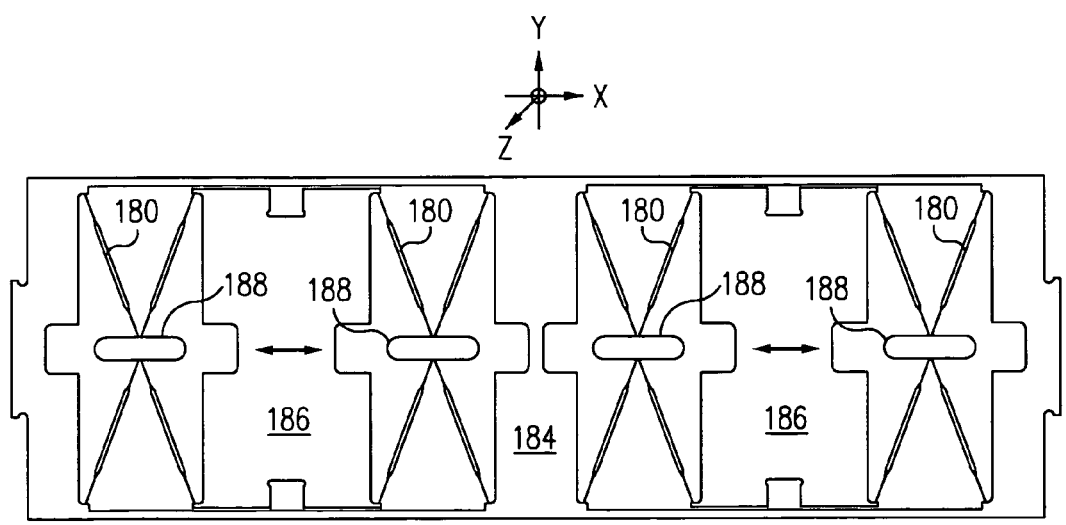
FIG. 18 is a top plan view of a pair of movable stages, in which each stage is shown supported within a respective opening of a support frame for coplanar, rectilinear movement therein by a respective pair of connecting elements in accordance with the present invention.
Figure 19A:
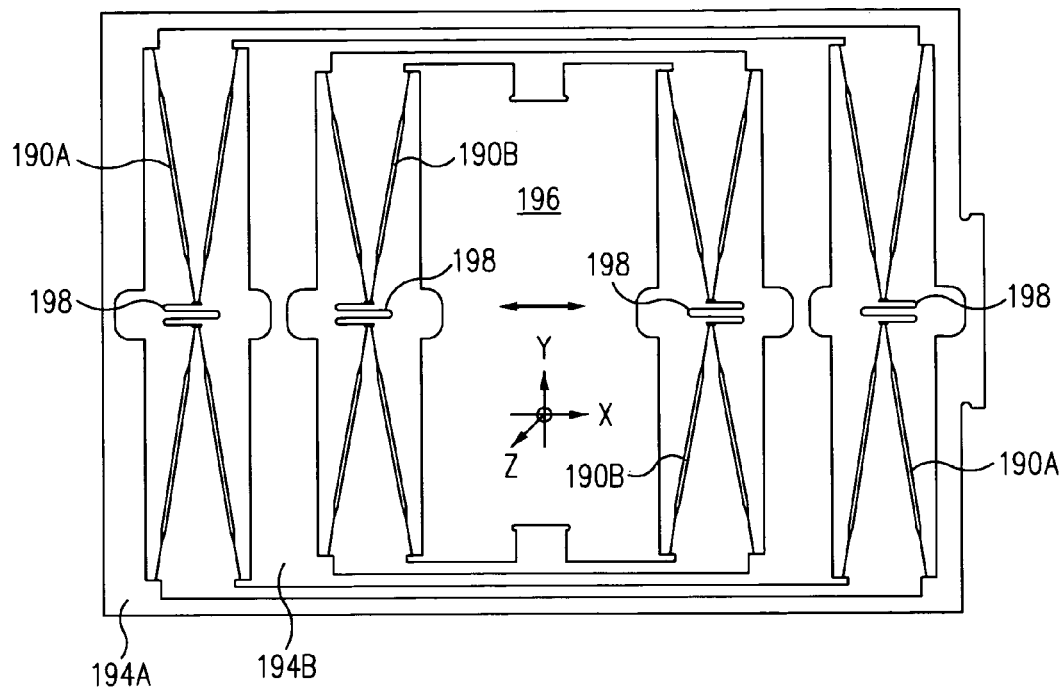
FIG. 19A is a top plan view of a pair of cascaded stages, each supported within a respective opening of a respective support frame for respective coplanar, rectilinear movement therein by a respective pair of connecting elements in accordance with the present invention.
Figure 19B:
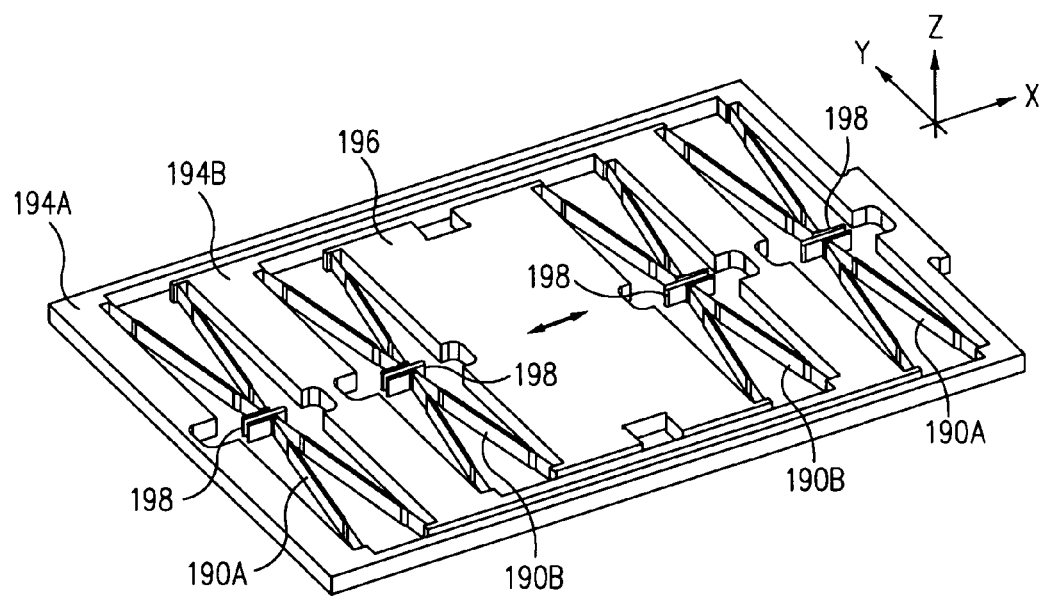
FIG. 19B is a perspective view of the cascaded stages of FIG. 19A.

According to one aspect of the current invention, multiple motion control stages can be assembled together to achieve a variety of advantageous embodiments. In FIG. 18, two motion control stages are manufactured on the same substrate. In this embodiment, the alignment of the two respective payloads 186 can be ensured to be highly precise. In FIG. 19A, a first motion control stage 196 is shown embedded inside a second motion control stage 194B. FIG. 19B is a perspective view of the same cascaded motion control stage. By cascading two sets of flexures 190A and 190B, i.e., by disposing one motion control stage inside of another, as illustrated in FIGS. 19A and 19B, a variety of advantages can be obtained relative to a single-stage embodiment, such as that illustrated in, e.g., FIGS. 14A, 17. First, the range of motion of the inner stage 196 is effectively doubled for the same applied force (i.e., if the stiffness of each of the flexures 190A, 190B are substantially the same), while the maximum stress induced in the flexures remains the same as for the single-stage embodiment of FIGS. 14A, 17. Second, if the cascaded stage 196 is used at the original range of motion of the single stage embodiment, that same motion can be obtained using only half the applied force, with only about half the level of stress of the single stage flexures. Accordingly; cascading may be used either to increase the range of movement of the stage, or to reduce both the stress in the flexures and the force necessary to achieve a given displacement of the stage 196. It is thus more efficient to cascade a stage than to simply double the length of the flexure arms in a single stage design. Less area is used by the stage assembly, and stiffness in some of the other DOFs will actually be greater than in a single stage that uses larger flexures.

Figure 20A:
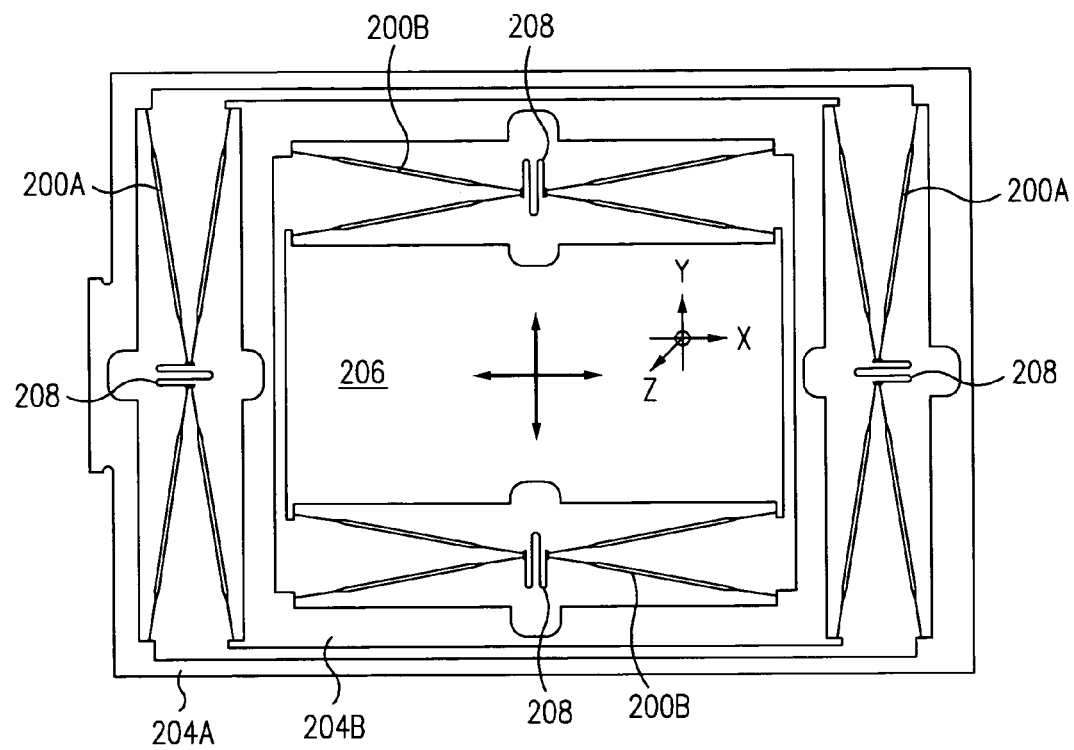
FIG. 20A is a top plan view of a pair of cascaded stages respectively supported for respective movement along each of two orthogonal axes by respective pairs of connecting elements in accordance with the present invention.
Figure 20B:
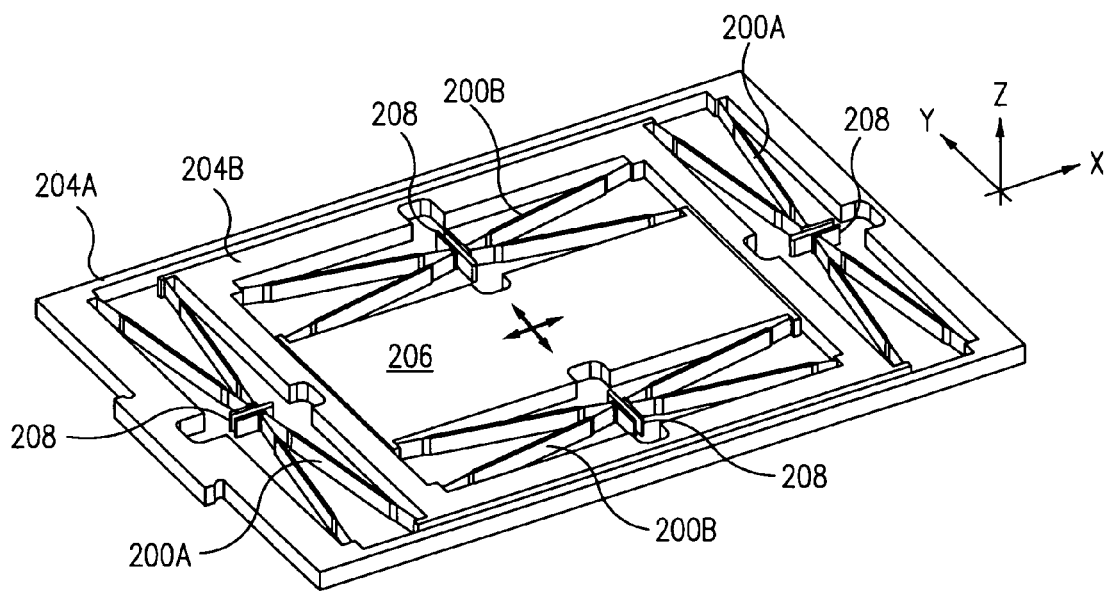
FIG. 20B is a perspective view of the cascaded stages of FIG. 20A.

FIGS. 20A and 20B are respectively top plan and perspective views of another motion control stage assembly incorporating a pair of cascaded stages 204B and 206, each supported within a respective opening of a respective support frame for respective coplanar, rectilinear movement by respective pairs of cruciform supporting elements or flexures 200A and 200B, each having an M-shaped secondary connecting element 208, in a configuration similar to that of FIGS. 19A and 19B. However, it should be noted that, in the cascaded embodiment of FIGS. 20A and 20B, the inner and outer stages are arranged to move perpendicularly relative to one another in the X-Y plane. Thus, if actuated by suitable motive forces, the inner stage 206 of such an embodiment can achieve substantially any type of rectilinear movement in the X-Y plane, rather than along just a single axis thereof.

Figure 21:
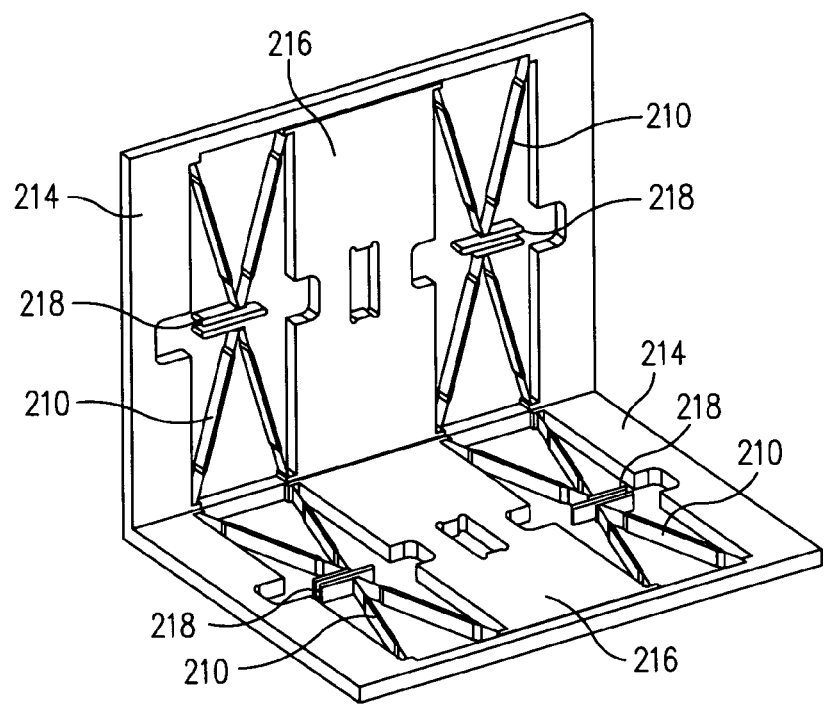
FIG. 21 is a perspective view of a non-planar motion control stage containing a pair of movable stages disposed at a right angle to each other and supported within a respective opening of a respective support frame for respective coplanar, rectilinear movement therein by respective 20, pairs of connecting structures in accordance with the present invention.
Figure 22:
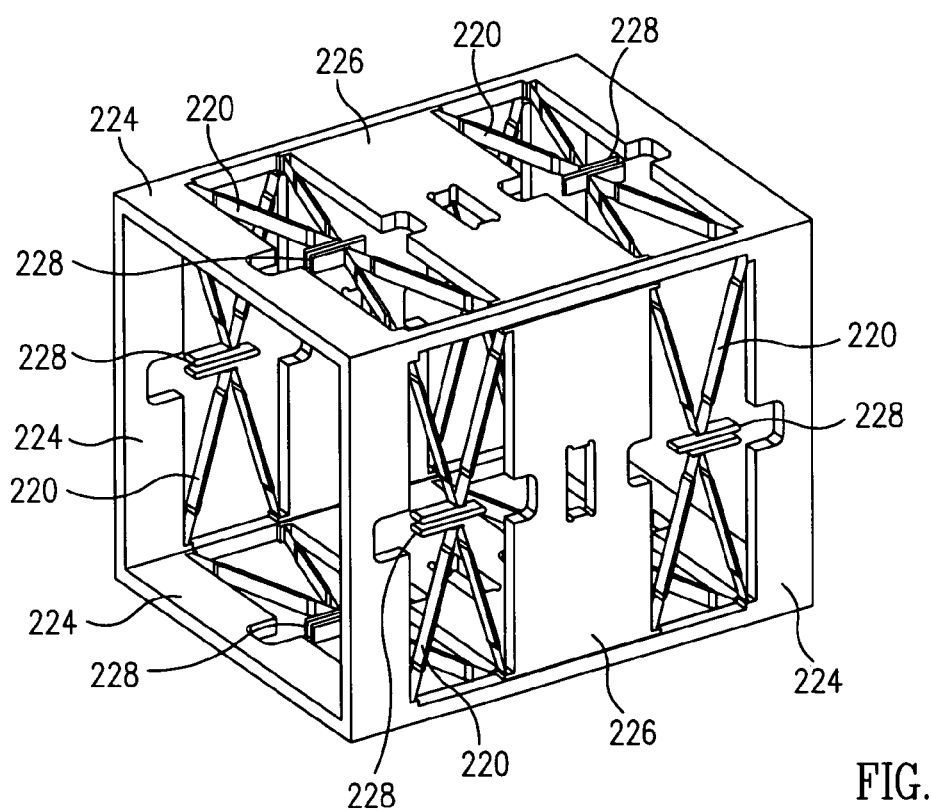
FIG. 22 is a perspective view of a non-planar motion control stage containing four movable stages disposed adjacent to each other at right angles and supported within a respective opening of a respective support frame for respective coplanar, rectilinear movement therein by respective pairs of connecting elements in accordance with the present invention.

Alternative exemplary embodiments of "non-planar" motion control stage assembly embodiments are illustrated in FIGS. 21 and 22, respectively. In FIG. 21, a pair of single-stage assemblies, similar to that illustrated in FIG. 14A, are connected to each other along a common side such that the respective stages 216 of the two assemblies are disposed at substantially a right angle to each other, and in FIG. 22, four such single-stage assemblies are connected to each other such that adjacent ones of their respective stages 226 are disposed at right angles to each other to form a box-like structure. Such non-planar configurations are useful for commonly supporting large and/or eccentric payloads (not illustrated) on the respective stages thereof, such as "large format" (i.e., same size or larger than a whole planar stage) lens assemblies of cameras. Thus, two stages mounted at right angles to each other, but having the same direction of rectilinear motion, such as illustrated in the embodiment of FIG. 21, have substantially increased rotational stiffness, thereby providing better straight-line motion in the presence of eccentric loads acting on the stages. The four-stage embodiment of FIG. 22, in which the stages are connected to the payload as two parallel pairs of stages disposed at right angles to each other, have even greater stiffness in the non-motion linear and rotational directions.

Another aspect of the invention relates to adding an actuator to the motion control stage to electronically control the position of the motion control stage along its predetermined trajectory. In this case, the actuator provides a force along one or more DOFs to move the payload along the substantially unconstrained trajectory. For example a magnetic voice-coil actuator may be integrated with the motion control stage to provide a force that moves the optical element along a desired trajectory. This actuator is composed of a coil and a permanent magnet, where the magnet is mounted on the payload and the coil is mounted on the base or vice versa. By running variable amounts of electrical current through the coil, the force between the coil and the magnet can be selectably adjusted to move the motion control stage to different points along its trajectory. Other types of actuators may be used, and an example using an electrostatic actuator is described in more detail below.

Figure 23A:
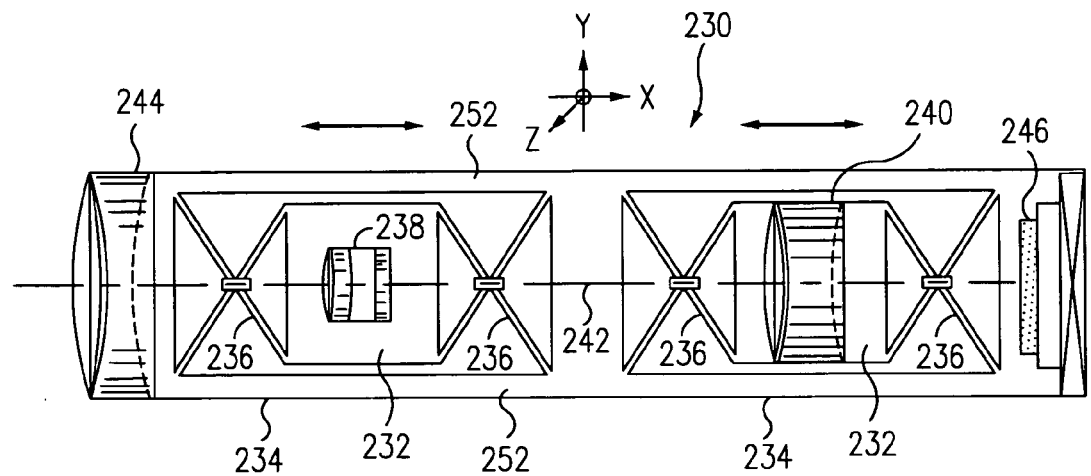
FIG. 23A is top plan view of a MEMS camera incorporating a pair of rectilinearly movable stages, each having a lens assembly mounted thereon and a pair of connecting element assemblies coupled to opposite sides thereof in accordance with an exemplary embodiment of the present invention; and, FIG. 23B is a partial cross-sectional elevation view of the MEMS camera shown in FIG. 23A.
Figure 23B:
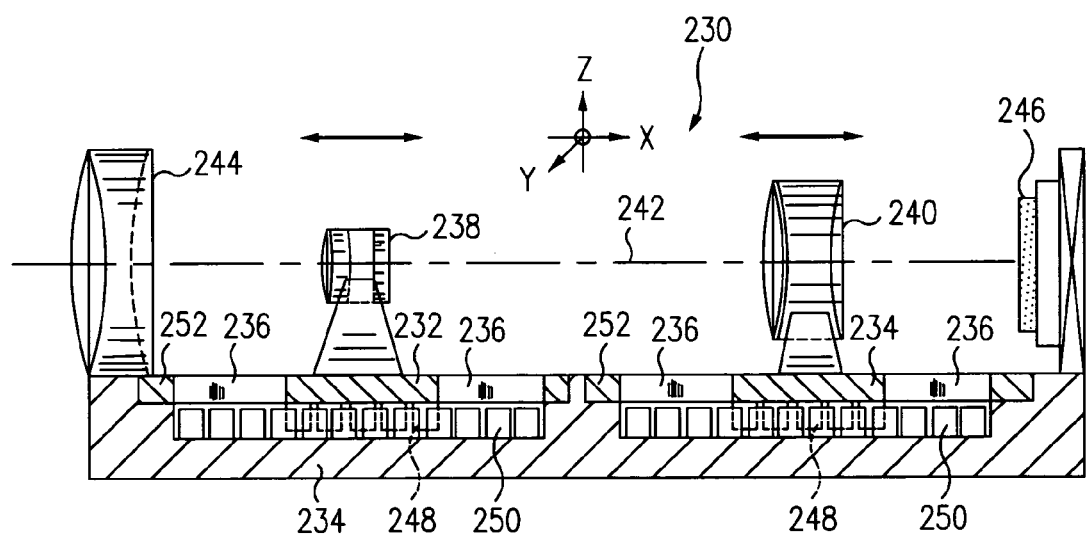

An exemplary MEMS camera device 230 incorporating a pair of, e.g., electrostatically motion control stages 232 therein, each supported relative to a fixed baseplate, or stator portion 234 by a pair of "cruciform" connecting element assemblies 236 in accordance with an exemplary embodiment of the present invention, is illustrated in the top plan and partial cross-sectional elevation views of FIGS. 23A and 23B, respectively. The camera is of a type that might be incorporated into, e.g., a cellular telephone having image capturing and transmitting capabilities. Each of the motion control stages carries a respective lens-element payload 238 and 240, e.g., a zoom lens element, and an autofocusing lens element, for respective independent, substantially rectilinear movement thereof along the optical axis 242 of the camera (i.e., the X axis in the particular embodiment illustrated), relative to the stator 234, and thus, relative to a third lens assembly 244, e.g., an objective lens, and a integrated circuit camera microchip 246, that are both respectively fixed to the stator.

In the particular embodiment illustrated, the two stages 232 are independently urged with straight-line motion along the optical axis 242 of the camera by, e.g., electrostatic forces that result from varying voltages applied to selected ones of upstanding, interdigitated "comb" fingers 248 and 250 formed on the respective opposing surfaces of the stator and the stage, as illustrated in FIG. 23B. However, it should be understood that other mechanisms for motivating the stages relative to the stator, such as pneumatic, hydraulic, electromagnetic, piezoelectric, magnetostrictive and the like, are also known in the art, and may be substituted for the electrostatically actuated comb structures illustrated.

As will be appreciated by those of skill in the optical art, it is very desirable from the standpoint of the image quality of the camera 230 that the respective movements of the zoom and autofocus lens elements 238 and 240 of the camera be precisely confined to movement along a trajectory corresponding to the optical axis 242 of the camera. Otherwise, the images produced by the camera will be distorted and/or unfocused. Further, it is desirable that the range of such rectilinear movement of the two stages be large enough to provide the camera with the largest possible ranges of focus and zoom, consistent with the overall size, e.g., 6×6×14 mm, of such a micro-miniature camera.

To achieve these ends, each of the stages 232 of the camera are suspended relative to the stator 234 by means of a pair of cruciform connecting element assemblies 236 in accordance with the present invention, as illustrated in FIGS. 23A and 23B. The connecting elements couple respective ones of two opposite sides of each stage to an opposing, inner edge of a coplanar support frame 252 that surrounds the stages, and that mounts on and in parallel opposition to the stator structure 234. The connecting elements 236 serve to space the stage apart from the stator, to avoid any frictional contact therebetween (although in some embodiments, there may be some frictional contact between the stage and stator) and to provide substantially coplanar, rectilinear motion of the stages relative to the support frame, and hence, relative to the stator, in a direction substantially perpendicular to the two supported sides of the stage. The novel connecting elements 236 of the invention thus provide straight-line motion of the stage to within one micron over several millimeters of travel, with wobble at the arcsecond level, a high ratio of in-plane and out-of-plane lateral stiffness to in-plane travel direction stiffness, and a substantially longer range of travel, viz., up to about 60% of the length of the flexures in said connecting elements, than prior art flexures.

Another aspect of the invention relates to a method of making a micromachined flexure assembly in a structure that is a part of a motion control stage. The method comprises using lithography to form a pattern on a substrate for the structure. The pattern outlines a set of connecting elements, a support frame, and: a center stage coupled to the support frame by the set of connecting elements. The method further comprises etching the substrate to form the structure according to the pattern. The micromachining process is described in detail above.

As will by now be evident to those of some skill in this art, many modifications, substitutions and variations can be made in and to the materials, components, configurations and methods of implementation of the connecting elements of the present invention without departing from its spirit and scope. Accordingly, the scope of the present invention should not be limited to the particular embodiments illustrated and described herein, as they are merely exemplary in nature, but instead, should be fully commensurate with that of the claims appended hereafter and their functional equivalents.

What is claimed is:

1. A connecting element for positioning a payload assembly with respect to a base assembly along a desired trajectory, the connecting element comprising:
   a first blade flexure; and,
   a strain relief feature connected to the first blade flexure.

2. The connecting element of claim 1, wherein the strain relief feature comprises a second blade flexure joined to the first blade flexure.

3. The connecting element of claim 1, wherein the connecting element is substantially planar.

4. The connecting element of claim 3, wherein the strain relief feature is radially symmetrical about an axis through its centroid and perpendicular to its plane, or bilaterally symmetrical about an axis through its centroid and parallel to its plane.

5. The connecting element of claim 1, wherein the strain relief feature is shaped like an M, a X, an S or an O.

6. The connecting element of claim 1, wherein the first blade flexure and the strain relief feature are formed integrally with each other.

7. The connecting element of claim 1, wherein at least the first blade flexure is formed of a semiconductor material, a resilient metal or a plastic.

8. The connecting element of claim 1, wherein at least the first blade flexure is formed by micromachining, wire-electrical-discharge machining, or injection molding.

9. A connecting element assembly for positioning a payload assembly with respect to a base assembly, the connecting element comprising:
   a first triangular connecting element with a first intermediate point;
   a second triangular connecting element with a second intermediate point; and,
   a secondary connecting element joining the first and second triangular connecting elements at the first and second intermediate points, wherein the first and second triangular connecting elements and the secondary connecting element are substantially planar with each other.

10. The connecting element assembly of claim 9, wherein the first intermediate point is approximately half way between the payload assembly and the base assembly.

11. The connecting element assembly of claim 9, wherein the secondary connecting element is radially symmetrical about an axis through its centroid and perpendicular to its plane, or bilaterally symmetrical about an axis through its centroid and parallel to its plane.

12. The connecting element assembly of claim 9, wherein the secondary connecting element is shaped like an M, a W, an S or an O.

13. The connecting element assembly of claim 9, wherein at least the first connecting element and the secondary connecting element are formed integrally with each other.

14. The connecting element assembly of claim 9, wherein at least the first connecting element is formed of a semiconductor material, a resilient metal or a plastic.

15. The connecting element assembly of claim 9, wherein at least the first connecting element is formed by micromachining, wire-electrical-discharge machining, or injection molding.

16. The connecting element assembly of claim 9, wherein the secondary connecting element substantially constrains the motion of the first intermediate point in one degree of freedom with respect to the second intermediate point.

17. The connecting element assembly of claim 9, wherein the secondary connecting element leaves the motion of the first intermediate point substantially unconstrained in one degree of freedom with respect to the second intermediate point.

* * * * *